United States Patent
Mueller et al.

(10) Patent No.: US 7,466,100 B2
(45) Date of Patent: Dec. 16, 2008

(54) DIGITAL HIGH-RESOLUTION CONTROLLER

(75) Inventors: Peter W. Mueller, Ann Arbor, MI (US); Jack M. Leason, Royal Oak, MI (US)

(73) Assignee: Peaktronics, Inc., Royal Oak, MI (US)

( * ) Notice: Subject to any disclaimer, the term of this patent is extended or adjusted under 35 U.S.C. 154(b) by 435 days.

(21) Appl. No.: 11/037,427

(22) Filed: Jan. 17, 2005

(65) Prior Publication Data

US 2005/0156545 A1 Jul. 21, 2005

Related U.S. Application Data

(60) Provisional application No. 60/538,106, filed on Jan. 21, 2004.

(51) Int. Cl.
*G05B 11/28* (2006.01)
(52) U.S. Cl. .................. 318/599; 318/811; 318/471; 318/432
(58) Field of Classification Search .......... 318/599, 318/811, 432, 434, 471
See application file for complete search history.

(56) References Cited

U.S. PATENT DOCUMENTS

| | | | | | |
|---|---|---|---|---|---|
| 4,417,312 | A | * | 11/1983 | Cronin et al. ............. 700/282 |
| 5,950,668 | A | * | 9/1999 | Baumann ................. 137/487.5 |
| 6,249,100 | B1 | * | 6/2001 | Lange ....................... 318/471 |
| 6,534,942 | B2 | * | 3/2003 | Schmidhuber ............ 318/563 |

OTHER PUBLICATIONS

"Valvcon, Things You Should Know to Operate, V Series 115VAC and 230VAC Standard Electric Actuators, Instruction Manual P/N I2001 Rev. 1" www.valvcon.com.
"Valvcon, 2075—V-Series Control Board Calibration Manual, Manual P/N I2075 Rev. A", www.valvcon.com.

* cited by examiner

*Primary Examiner*—Rina I Duda
(74) *Attorney, Agent, or Firm*—Harness, Dickey & Pierce, P.L.C.

(57) ABSTRACT

Kinematic control of an electronic positioner and its associated actuator is effected through a control algorithm that delivers energy to the actuator based on observed motion produced by a previous delivery of energy. The algorithm achieves control based on a desired or user-specified resolution. Electronic braking between energy delivery intervals improves the speed at which the desired position is achieved. Temperature of the force producing mechanism is determined, as by monitoring energy consumed, and used to control how power is delivered to the actuator.

31 Claims, 12 Drawing Sheets

Prior Art

*Prior Art*

DIGITAL HIGH-RESOLUTION CONTROLLER

CROSS-REFERENCE TO RELATED APPLICATIONS

This application claims the benefit of U.S. Provisional Application No. 60/538,106, filed on Jan. 21, 2004. The disclosure of the above application is incorporated herein by reference.

FIELD OF THE INVENTION

The present invention relates to an electronic positioner, and more particularly to kinematic control of an electronic positioner and its associated actuator.

BACKGROUND OF THE INVENTION

An electronic microprocessor-based unit may be used to control an actuator used in a variety of automated valve applications. Such a unit is commonly referred to as an electronic positioner, or simply a "positioner," or as a servo card, or simply a "servo." An AC actuator is an electromechanical device that uses a motor, such as an AC split phase motor or even a three-phase motor, to rotate an output shaft that can be mechanically coupled to a valve, thus allowing the actuator to open and close the valve. A DC actuator uses a DC motor. Some actuators may use the motor to move a linear rod back and forth for special type applications.

Most valves used to control the flow of fluids or gases through piping naturally tend to have a rotation of 90°, or one quarter of a circle. Hence, the name "quarter turn actuator" is widely used and recognized. In most applications, 0° is identified with the closed position, while 90° is identified with the full open position. From a control view point, the valve is commonly described in terms of percent open, where 0% corresponds to the closed position and 100% corresponds to the full open position, regardless of the number of degrees between the open and closed position. Quarter turn actuators are typically rated for their speed, where the rating defines the number of seconds the actuator requires to move from 0° to 90°. Most actuators fall within a range between 2 seconds and 90 seconds.

Referring to FIG. 1, an exemplary AC split phase motor 10 has been illustrated. It includes motor windings 12 and 14. The motor winding 12 provides for clockwise motion of the motor 10 while the motor winding 14 provides for counter-clockwise motion of the motor 10. With respect to a valve (not shown), the motor winding 12 provides motor motion to open the valve and the motor winding 14 provides motion to close the valve. First ends of each of the windings are connected to a first AC power line 16. As shown, the first AC power line 16 is a neutral line and is referred to as "motor neutral" or "motor common." A control switch 18 may then be used to operate the valve by connecting a second AC power line 20 to the appropriate winding.

Limit switches 22 and 24 are typically used to disconnect power from the motor 10 when the valve has reached its end of travel in order to avoid a continuous stall condition on the motor 10. A continuous stall condition may cause the motor windings 12 and 14 to overheat and permanently damage the motor 10. The limit switches 22 and 24 are typically actuated by cams mounted on an output shaft of the motor 10. The cams are positioned to turn the limit switches 22 and 24 off at a desired point of rotation. In other words, the limit switches 22 and 24 are turned off when the valve is completely open or closed.

AC motors may be equipped with a thermal switch 26. The thermal switch 26 disconnects the first AC power line 16 when a specific motor temperature, such as 200° F., is reached, and then reconnects the first AC power line 16 when the motor 10 has cooled. This feature safeguards against adverse conditions such as a motor stall in the normal operating range, a motor failure, and/or excessive cycling of the actuator.

Some actuators implement torque switches to detect a motor stall condition. The thermal switch 26 is primarily intended as a safety feature to avoid a fire hazard. However, regular tripping of the thermal switch 26 can damage the motor components leading to significantly reduced motor life. In contrast, torque switches can turn off the motor 10 before excessive heating occurs. A torque switch is implemented for each direction, open and close, so that if one of the torque switches turns off the motor in its associated direction, the other motor winding can be operated. If the motor 10 is able to move freely in the other direction, the torque switch is reset, thus allowing operation in the first direction. Electrically, each torque switch is wired in series with the limit switch for a given winding, so the limit switches 22 and 24 electrically represent both a limit switch and a torque switch, where either a limit position or a torque trip function will disconnect the motor winding.

Still referring to FIG. 1, a motor capacitor 28 creates a phase shift between the powered winding and the unpowered winding. The phase shift in the unpowered winding generates a magnetic field that works in conjunction with the primary magnetic field in the powered winding that causes the motor 10 to rotate in a specific direction. When the other winding is powered, the phase shift causes the magnetic polarity between the windings to switch, thus causing the motor 10 to rotate in the opposite direction. When the capacitance of the capacitor 28 is increased, the phase shift also increases, thus creating a greater magnetic differential between the windings. This results in higher torque output from the motor 10. While larger capacitance is commonly used to obtain higher torques, the increased capacitance also allows a higher current to flow through the unpowered winding. This increased current results in additional heating of the motor 10, and consequently motor specifications are usually derated from 100% duty to levels as low as 25% duty.

When power is initially applied to a given winding, an in-rush current is generated that is equal to the AC voltage divided by motor winding resistance. Once the motor begins rotating, its motion through the magnetic fields generates a counter EMF that dramatically reduces the current draw. The unpowered winding also adds to the in-rush current by drawing current through the motor capacitor 28, so when larger capacitance is used to increase torque, the in-rush current also increases. In-rush currents typically range from 2 to 3 times the normal running current and typically last for 100 milliseconds. The in-rush current causes a dramatic heating effect compared to normal running currents, and consequently motors are commonly rated for a maximum number of starts per hour. For example, a 100% duty motor may be rated for a maximum of 12,000 starts per hour.

If the motor 10 mechanically stalls, the motor current will naturally increase to the value of the in-rush current since the motor 10 is not rotating through the magnetic fields. While torque switches safeguard against most stall scenarios, an occasional failure in typical applications occurs when a valve is restricted by debris, which allows the actuator to move within a small range (e.g. a few degrees). This would allow an erratic control signal to constantly oscillate between stall conditions in both directions. The resulting combination of stall currents and inrush currents eventually overheat the motor 10, thus tripping the thermal switch 26.

Electronic Positioner Basics

In order to control a motor, such as the illustrated AC split phase motor electronically, the control switch 18 is replaced with an electronically controlled switching device. One approach is to replace the control switch 18 with a relay that can be controlled by electronic circuits. However, a relay may switch at a random point of time during the AC sine wave. When the relay contact applies power to the motor winding near the peak of the sine wave, the sudden change in voltage to the motor winding generates a significant electrical transient, which can cause electrical interference with the circuits controlling the relay as well as other electronic equipment in the vicinity. Additionally, the mechanical nature of a relay places limits on the number of switching cycles. Typically, the number of switching cycles is less than 1,000,000. The transients generated during switching causes undesirable electrical arcing between the relay contacts, which burns the contact surfaces and gradually degrades the relay. This results in an electrical cycle limit that is typically 1/10 of the mechanical cycles.

A better solution to controlling the motor is to replace the control switch 18 or relay with solid state devices which do not have moving mechanical parts, thus eliminating mechanical wear and the undesirable arcing. While a variety of solid state devices and circuits can be used, the most common devices used are triacs 30 and 32 as shown in FIG. 2. The triac 30 includes a primary triac Q1 and a secondary triac Q1a. The triac 32 includes a primary triac Q2 and a secondary triac Q2b. The secondary triacs Q1a and Q2b are used to gate the primary triacs Q1 and Q2, respectively, thereby turning the primary triacs Q1 and Q2 on and off. The secondary triacs Q1a and Q2b are optoelectronic devices that provide electrical isolation between the motor circuit and the control circuit in the same manner that a relay coil is isolated from its contacts. Additionally, control LEDs LED1 and LED2 may be controlled by a low voltage, low powered device such as a microprocessor. Resistors 34 and 36 in the secondary triac circuits are used to limit current through the gates of the primary triacs Q1 and Q2.

A common practice that further enhances triac control is the use of a zero-crossing circuit that prevents on or off switching of the primary triacs Q1 and Q2 unless the AC line voltage is at a zero voltage point. This dramatically reduces the electrical transients generated when power is applied to the motor 10 at random times. Optically coupled triac devices have long been available with such zero-crossing circuits integrated within the device and are commonly implemented in positioner designs. This allows random switching of the control LEDs LED1 and LED2 without causing random switching of the primary triacs Q1 and Q2.

While zero-crossing controlled triacs resolve random switching problems, the limit switches 22 and 24, torque switches, thermal switch 26, or any other power disruption of the AC line voltage can cause "random switching" of power to the motor 10. These events generate transients that may damage the triac circuits 30 and 32. To prevent damage to the triacs 30 and 32, snubber circuits (not shown) may be used.

A means to control the positioner is required in order to turn the motor 10 on and off to achieve a specific percent-open position. Automated control systems may provide command signals that are either analog or digital. Common analog signals used are 0-10V, 0-5V, 1-5V, or 4-20 mA, where the particular signal used represents 0 to 100% open. Digital signals may take the form of pulse width modulation, frequency modulation, or one of many forms of data communications.

Regardless of what type of signal is used, the signal is interpreted as a percent-open command. In order to turn the motor 10 off at the desired position as dictated by the command signal, the positioner monitors the position of the actuator's output shaft. Monitoring the output shaft position may be achieved by mechanically coupling a feedback potentiometer to the output shaft. Most actuators use a set of gears to couple the feedback potentiometer by mounting one gear to the output shaft, which in turn rotates a second gear mounted to the potentiometer shaft. Since potentiometers and actuators have a finite rotating range, the potentiometer rotation needs to be aligned with the output shaft rotation. That is, when the valve position is at 50% open, the potentiometer wiper is ideally at 50% resistance. Alignment is accomplished by tightening the gears to their respective shafts when the valve is 50% open and the potentiometer is set to 50%.

Referring now to FIG. 3. a positioner 40 applies an excitation voltage +V (usually 10V or less) to a feedback potentiometer 42 and measures the voltage on the potentiometer's wiper 44 which is proportional to the angular position of the output shaft. To position the valve to a desired percent-open, the positioner 40 compares a feedback signal 46 from the feedback potentiometer 42 to the command signal 48 and determines whether to turn on the open motor winding or the close motor winding, and then ultimately turns the motor 10 off when the command signal 48 matches the feedback signal 46. Analog positioners achieve this by scaling the command signal 48 and/or the feedback signal 46 using adjustable amplifiers (scaling amplifiers) with adjustable offsets, so that both signals produce equal voltages at 0% and 100% open. The offset adjustment normally dictates the 0% value and is referred to as the zero setting. The gain of the amplifier dictates the 100% value and is referred to as the span setting. Digital positioners perform the same task by converting the command signal 48 and the feedback signal 46 to numerical values using an Analog-to-Digital (A/D) converter circuit. Once in numerical form, a microprocessor can set zero using addition operations, set span using multiplication operations, and then logically compare the scaled numerical values. For digital positioners, comparators 50 and 52 represent a logic operation rather than actual circuits.

In order to function correctly, the motor 10 and feedback potentiometer 42 must be wired to the positioner 40 in a particular manner. In most applications, when the motor 10 moves the valve toward the open position, the wiper 44 of the feedback potentiometer 42 will move toward the +V terminal, which increases the voltage measured on the wiper 44. In this case, commonly called "forward acting," the comparator 50 will turn on the open motor winding whenever the feedback signal 46 is less than the command signal 48. Likewise, comparator 52 will turn on the close motor winding whenever the feedback signal 46 is greater than the command signal 48. The eventual relationship between the valve motion and the feedback signal 46 can be inverted by a variety of conditions such as mounting orientation of the feedback potentiometer 42, the coupling mechanism to the feedback potentiometer 42, and mechanical couplings between the actuator and valve. Consequently, some applications require "reverse acting." For reverse acting, when the command signal 48 increases, the actuator will move toward its defined closed position. Likewise, when the command signal 48 decreases, the actuator will move toward open. Since mechanical couplings and mountings are not easily altered, reverse acting is better achieved by rewiring the motor 10 and feedback potentiometer 42 connections to obtain the desired relationship. While this polarity-sensitive relationship is quite simple, it is a source of common problems since there are multiple ways to invert the relationship.

When the positioner 40 turns off a given motor winding, inertia built up in the motor 10 allows the motor 10 to continue moving past the desired position. When this occurs, the positioner 40 will immediately attempt to turn on the opposite motor winding to reposition the actuator. Inertia in the opposite direction then causes the actuator to coast past the desired position again. The end result is that the positioner 40 is never satisfied, and the actuator will oscillate back and forth. This is referred to as "hunting". To avoid hunting, conventional positioners employ a deadband adjustment, which effectively adds offsets to comparators 50 and 52 to create a third state where both motor windings are off. This results in a condition that requires the difference between the command signal 48 and the feedback signal 46 to be greater than the deadband setting before the motor 10 can be turned on again.

The coasting effect of a motor can vary widely depending on actuator speed, motor size, the type of valve used, loading on the valve, and environmental conditions. For commonly available actuators, the coasting effect is at least 0.5° and can be as much as 30°. To minimize coasting, many actuators employ a mechanical brake. While a wide variety of brake designs are implemented, most utilize a common design principle. The brake consists of some type of mechanical device that applies friction to the motor shaft and some type of solenoid device that releases the mechanical friction from the motor shaft. By connecting the solenoid device across the open and close motor windings, the solenoid will release the brake anytime either motor winding is turned on. Likewise, when both windings are turned off (in the deadband range), the mechanical device applies the braking friction to the motor shaft. Since a mechanical brake involves moving parts that require time to move, they are not effective for reducing the coast below 0.5°. However, mechanical brakes are effective for limiting the coast to 2° or less. Mechanical brakes serve a second purpose of holding the actuator's position after a positioner turns off the motor. Actuators that implement spur gear designs are easily backdriven by loads on the valve and consequently almost always employ a mechanical brake.

Since mechanical brakes work on the principle of friction, brake performance will vary with temperature and wear. Additionally, materials used in brakes quite often cannot withstand the higher temperatures that may result if the motor overheats. The solenoid device in the brake is also prone to temperature, where the solenoid may not disengage the brake, thus resulting in eventual overheating of the motor, causing permanent damage to the brake. To eliminate the mechanical brake, some actuator designs utilize mechanical techniques (such as a worm gear drive) that prevents backdrive from the load. However, this does nothing to eliminate coasting that effects the performance of a positioner since the source of the inertial energy, the motor, is not arrested.

Resolution

In relation to actuators, resolution is a measure of the smallest repeatable motion that can be made. For quarter turn actuators, resolution is measured in degrees of rotation. Since the ultimate purpose of using electronic positioners is to control a valve to a specific percent-open position, performance of a positioner is measured according to its ability to consistently achieve any desired or commanded position. Therefore, resolution becomes the most significant measure of performance.

The primary factor of an automated control system affected by resolution is the number of discrete motions the actuator can make over a given control range. As mentioned earlier, conventional positioners employ a deadband setting to prevent unstable operation or hunting. Since the motor is intentionally turned off until the difference between the command signal and feedback signal exceeds the deadband setting, the deadband setting dictates the smallest discrete motion that can be made. As previously mentioned, the mechanical characteristics of an actuator results in a deadband greater than 0.5°, or 180 points of resolution over the 90°. While combining certain positioners with certain actuators can optimize resolution, achieving more than 200 points of resolution is not practical without employing new technology or techniques.

While 180 points of resolution may appear to be significant, commonly used butterfly valves and ball valves can only make use of about ⅓ of the available resolution. This is due to the fact that these types of valves essentially allow 0% to 100% of their flow by the time the valve reaches a point of 33% open, thus reducing the usable points of resolution to sixty. Since most automated systems try to control a particular flow rate, the process controller typically operates a valve in an even narrower range that does not usually exceed 10°. This results in only twenty points of resolution to maintain a stable flow.

To achieve a particular flow rate through a valve, a process controller may move a valve between two points of resolution in order to achieve a "point" in between. Due to the damping effect of large volumes of fluids or gases, switching between two points of control fast enough results in a controlled flow that is an average point between the two points of resolution. Often, the rate at which a process controller needs to switch between two points is faster than the actuator motor can operate without overheating. To compensate, a more expensive actuator with a higher duty cycle is used.

One technique used to improve resolution in special applications is to use precision machined ball valves known as V-ball valves. This type of valve makes use of nearly the full range of the valve by restricting the flow through the valve with a precision cut ball that is shaped like a "V". This allows the full 180 points of resolution to be used from 0% to 100% open. The net result allows the process controller to use a wider motion, or more points of resolution, to maintain a stable flow.

Another technique used to improve resolution is to expand the actuator's range from 90° to 180°. By gearing the actuator output shaft back down to a 90° motion for a valve, the resulting resolution at the valve can theoretically be reduced in half to 0.25°. However, each stage of gearing introduces backlash that cannot be compensated for since the positioner can only monitor the position of the actuator's output shaft. This results in a practical resolution of 0.3° or more. While the technique of expanding the actuator's range could be further expanded, the increased backlash produced by the gearing between the actuator and valve puts a practical limit on resolution of 0.3°.

In order to achieve better resolution using mechanical techniques, another practical limitation encountered is cost. By design, an actuator achieves better resolution when it employs a mechanical brake, is geared to a slower speed, and utilizes one of the techniques mentioned above. In practice the end result is that higher resolution is obtained at a significant cost for larger, slower, and bulkier actuators being used with more expensive specialized valves.

SUMMARY OF THE INVENTION

The present invention provides a low cost and yet highly effective solution for providing dramatically increased resolution. The controller employs a motor control algorithm that is capable of moving the motor to a desired motor position regardless of deadband or backlash. Unlike conventional control algorithms that adjust motor position (shaft position) based on measured position, the present algorithm establishes motor position based on observing motor motion. Energy is supplied in discrete quantities based on the motion produced by previous supplied energy quantities, and not merely based on the current static position of the motor shaft. Thus, the control algorithm is able to adapt to actual kinematic conditions. If the motor is controlling a valve that regulates a non-homogeneous viscous liquid, for example, the ability of the motor to open and close the valve may depend on the current viscosity of the liquid. The control algorithm can sense this condition and adapt accordingly.

According to one aspect of the invention, a method of controlling a motor is provided where a first quantity of energy is supplied to the motor to produce motion. The motion so produced is observed and a second quantity of energy is supplied to the motor based on the observed motion, such that the motion produced can achieve a desired position.

In one preferred embodiment, the time interval between supplying of the first and second quantities of energy is controlled. When the current motor position is far from the desired position, quantities of energy are delivered at a first rate (delivered at spaced intervals according to a first period). When the current motor position gets closer to the desired position, quantities of energy are delivered at a second rate, preferably slower than the first rate. In this way, when the motor position is far from the desired position, energy quantities are delivered more rapidly (but with less computational precision). As the motor gets closer to the desired position, energy quantities are delivered more slowly. This allows time for the fractional inertial motion to be dissipated before delivering the next quantity of energy.

In another preferred embodiment, an electronic braking mechanism is invoked. Electronic braking reduces large coasting, which also requires long periods of time, after full power is applied to the motor. While not required in all applications, the electronic braking mechanism provides a means for attaining resolution accuracy in timely manner.

Thus the present invention addresses resolution with a new approach. Electronic positioners developed using this new approach will achieve high resolution and may be used with a variety of actuators and in a variety of applications. If desired, this new approach can be adapted for use in systems that use some of the other techniques mentioned above for even further performance improvement.

Among the many benefits of the new approach, motor overheating due to excessive cycling and due to stall conditions is reduced. Incorrect or unstable operation due to rapid or erroneous signal changes or due to electrical noise or environmental conditions is also eliminated. Installation and setup of the positioner is also greatly simplified because the new approach makes possible: automatic polarity detection to eliminate incorrect operation due to wiring; elimination of calibration steps and procedures; elimination of instrumentation used for setup; and convenient three button digital control to configure all setup parameters.

Moreover, further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Kinematic Control of Electronic Positioner

The digital high-resolution controller effects kinematic control of the electronic positioner and its associated actuator. High accuracy is achieved through a kinematic control algorithm that measures and adapts to actual observed motion of the actuator and mechanical systems coupled to the actuator. A detailed discussion of the new kinematic control system will now be presented.

Control Algorithm Overview

Figure 10:
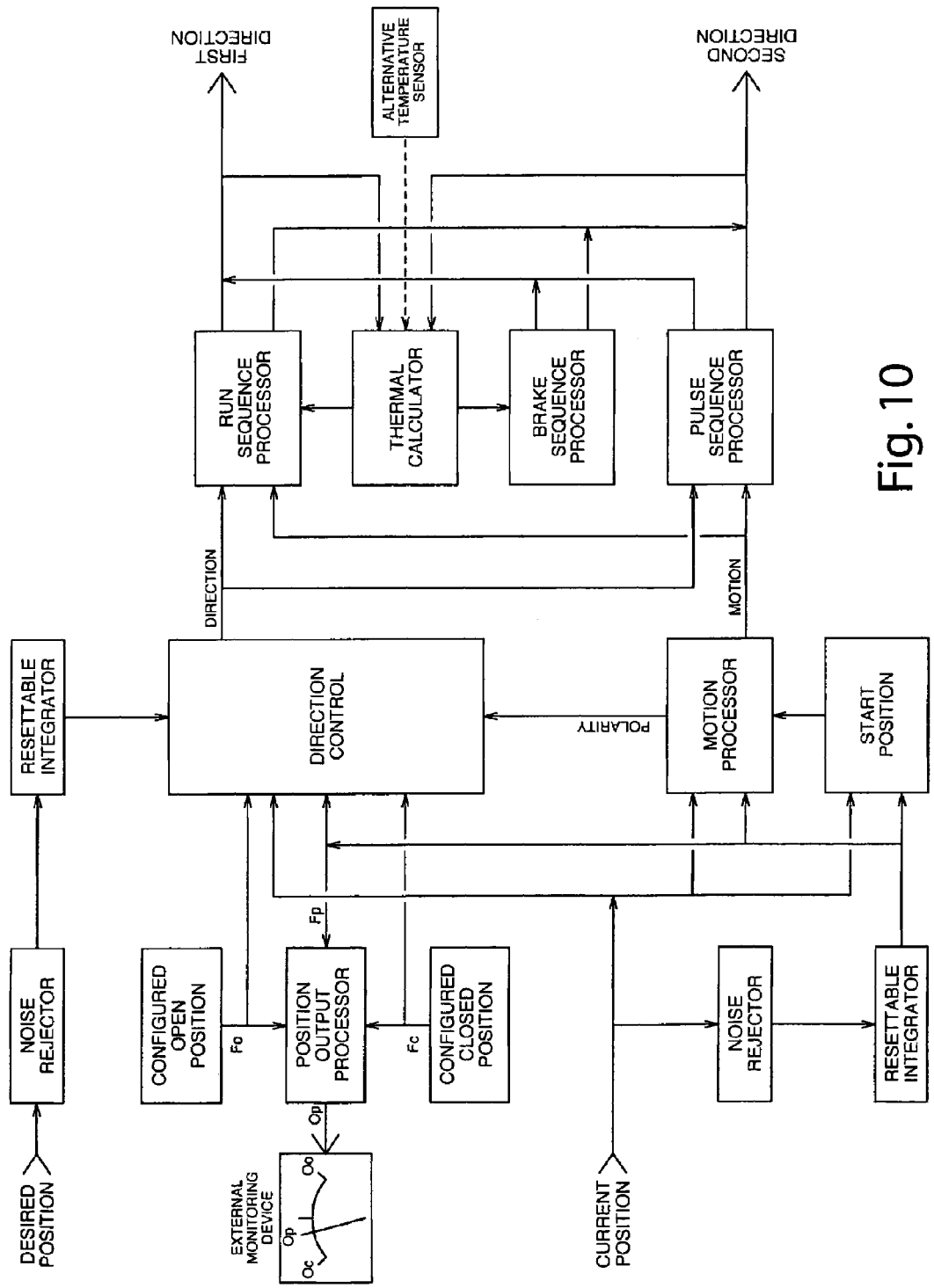
FIG. 10 is a functional block diagram, illustrating some basic principles of the control algorithm.

Referring to FIG. 10, an overview of the control algorithm will first be presented. FIG. 10 illustrates the control algorithm as a collection of interconnected functional processes. These processes may be carried out by a suitably programmed microprocessor (shown in the circuit diagram of FIG. 11 discussed below.) According to the presently preferred embodiment, a computing device, such as a microprocessor, is programmed to deliver quantities of energy to the motor in controlled packets to either the first direction output or the second direction output. The outputs are in the form of logic states (on or off) which then are converted to appropriate electrical signals to power the motor. In the preferred embodiment, the outputs, Q1 and Q0 in FIG. 12, are used to control the triac outputs, Motor 1 and Motor 2, to drive an AC split phase motor. In other applications, these outputs could be used to control a reversible DC motor, solenoid valves to control a pneumatic piston, relays to control 3-phase motors, or any other device that can be electrically controlled to provide motion. Inputs to the control algorithm consist of the command signal, which provides the desired position information, and the feedback potentiometer signal, which provides the current position information. Each block in FIG. 10 represents a sequence of microprocessor instructions that performs operations on its input data and provides output data to other blocks according to the input data. The microprocessor, not shown, controls the flow of data and timing of all operations.

Control Modes

Figure 10A:
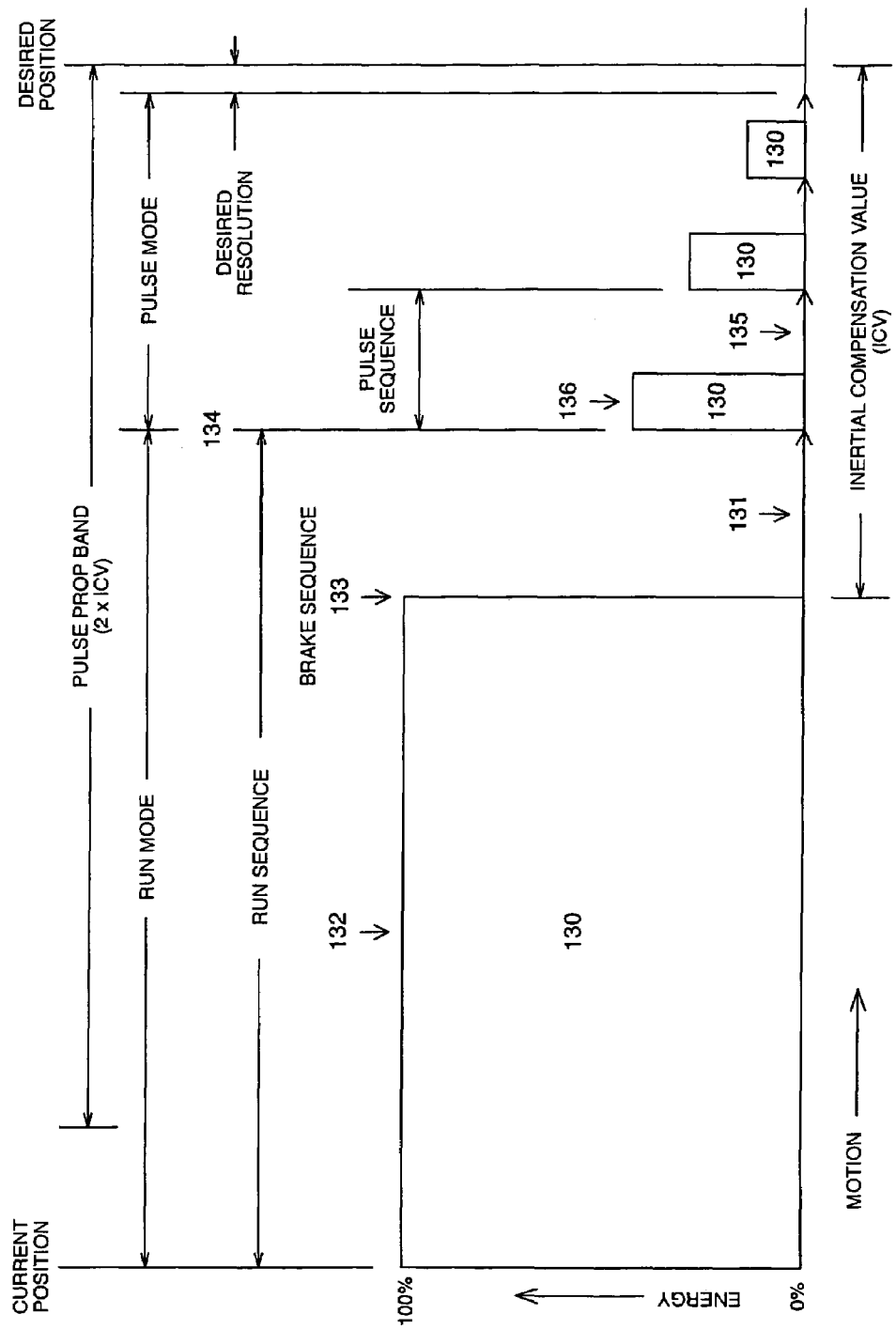
FIG. 10A is an energy vs motion diagram, useful in understanding the operation of the control algorithm illustrated in FIG. 10.

First the microprocessor determines which of two motor control modes, the run mode or the pulse mode, is to be used. Referring now to FIG. 10A, energy packets 130 are delivered to one of the outputs (e.g. the first direction) in either the run mode or the pulse mode. The run mode is enabled whenever the current position is outside of the pulse prop band while the pulse mode is enabled whenever the current position is inside of the pulse prop band. For the other output, the diagram is mirrored, meaning that motion takes place from right to left instead of from left to right as shown. As illustrated in FIG. 10D, a pulse mode is enabled when inside the pulse prop band.

To provide orderly switching between the modes, the pulse mode cannot be enabled until the run mode completes a run sequence. Once the pulse mode is enabled, the run mode cannot be enabled until the pulse mode completes a pulse sequence. FIG. 10A shows that the conclusion of a run sequence moves the current position within the pulse prop band, at which time the pulse mode is enabled. Note that once the pulse mode is enabled, the demarcation between the run mode and pulse mode would then shift to the entire width of the pulse prop band.

Once the control algorithm achieves a position that is consistent with the desired resolution, both modes are disabled until a change in the desired position triggers either mode back on. The desired resolution is only limited by one of two factors: the smallest motion that can be made with a given actuator mechanism, or the finest resolution of the current position information, whichever is greater.

Run Sequence Processor

The run sequence processor block in FIG. 10 determines the energy packet for the run mode. The first direction or second direction is then selected for output based on the direction information provided by the direction control block. The motion information provided by the motion processor block is used to measure the subsequent coast 131 which is then used to calculate an inertial compensation value (ICV) as described more fully below.

A complete run sequence consists of the following: apply a 100% energy packet 132 to the selected output at a position outside of the pulse prop band, apply a brake sequence 133 at a position equal to the desired position less ICV, measure the subsequent coast 131, then calculate a new value for ICV at 134.

Referring to FIG. 10A, note that in the presently preferred embodiment the run mode consists of only a single run sequence, one that applies constant full power to the motor, and ends when the position equal to the desired position less ICV is detected. In this way, the run mode is similar to conventional positioners. However, conventional positioners end such a run mode based on the desired position less the value of a deadband setting, which is merely a fixed value intended to prevent hunting. In contrast, the ICV value used by the preferred embodiment is a measure of actual motion dictated by conditions of the actuator, its load, and environment. In this way, the invention eliminates, or compensates, deadband.

The input from the thermal calculator provides the percent duty information to be used by the run sequence processor depending on thermal conditions in the motor (see THERMAL CALCULATOR section below). When this occurs, the run sequence shown in FIG. 10A becomes a series of on-off periods. This is still considered a single run sequence and terminates in the same manner as described above. Since a brake sequence inherently generates significant heat in the motor, the brake sequence 133 may optionally be removed during duty control to reduce further heating. This is done in the preferred embodiment.

Brake Sequence Processor

Note that the brake sequence 133 is actually part of a run sequence and may optionally be removed where the output is merely turned off. The consequence of this is that the subsequent coast 131 will be greater and require more time. In turn, the ICV would be greater, causing the pulse prop band to be greater. The end result is that the controller, and hence the actuator, will require more time to achieve the desired position.

Since the brake sequence is an inherent operation that is triggered by the difference between the desired position and ICV, the brake sequence processor requires no other input information to perform the brake operation described below. The input from the thermal calculator block enables or disables the brake sequence depending on thermal conditions in the motor.

Thermal Calculator

The thermal calculator block monitors when and how the outputs are turned on and calculates the thermal effects of the output on the motor. Further details of calculating thermal effect are presented below. Based on the thermal calculations, the thermal calculator provides the percent duty of operation for the run sequence processor and enables or disables the brake sequence processor.

Alternatively, an actual temperature sensor could be used to monitor the thermal conditions of the motor. The sensor information, rather than the calculated temperature, would then be used to calculate percent duty information. While requiring additional components and circuits, this approach would simplify the thermal calculator code and has the advantage of providing actual thermal conditions of the motor which would include ambient temperature effects.

Pulse Sequence Processor

The pulse sequence processor block determines the energy packet for a given pulse sequence in the pulse mode. The first direction or second direction is then selected for output based on the direction information provided by the direction control block. The motion information provided by the motion processor block is used to measure the subsequent motion 135, which is then used to calculate the parameters for the next pulse sequence.

A complete pulse sequence consists of the following: apply a fractional energy packet 136 to the selected output at a position inside of the pulse prop band, measure the subsequent motion 135 at the end of the pulse sequence, then calculate new parameters for the next pulse sequence. The parameters of a pulse sequence consist of the following: the pulse sequence length of time, the energy level of the energy packet 136, and the rate at which the energy level changes from one pulse sequence to next.

Unlike the run mode, the pulse mode will consist of one or more pulse sequences, as is shown in FIG. 10A. Since the pulse sequence length of time is a key parameter, a complete pulse sequence is a single entity, and therefore no other operation will be allowed until the pulse sequence has ended. Further, the difference between the desired position and the current position is used in calculating the parameters for a pulse sequence. As a result of this, the desired position information is stored at the start of a pulse sequence at 134. In order to maintain stable pulse operation, changes in the desired position are ignored until the pulse sequence is complete.

Figure 10B:
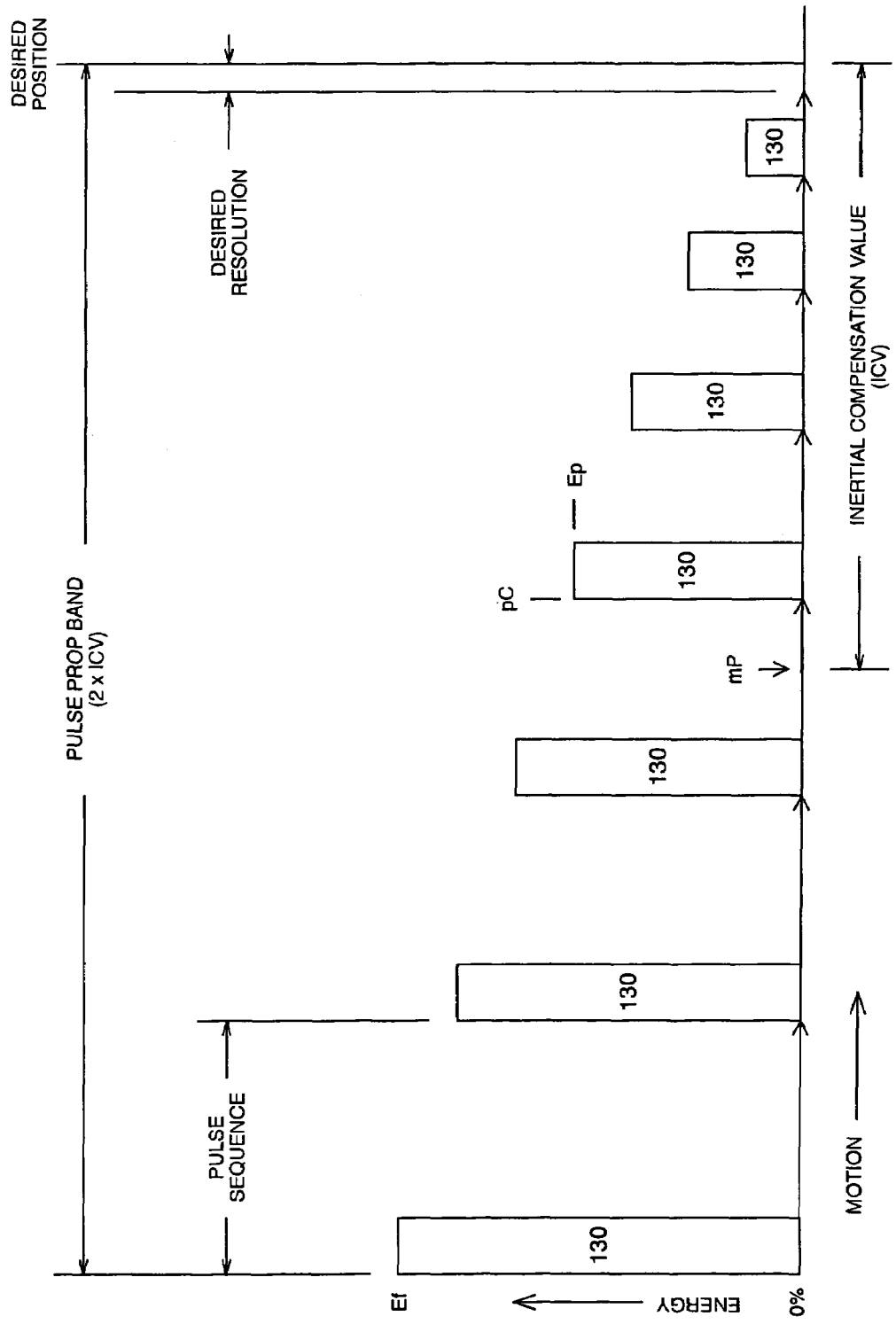
FIG. 10B is an energy vs motion diagram, focusing on the pulse prop band interval also shown in FIG. 10A.

As noted earlier, once the pulse mode is enabled, it remains enabled for the entire width of the pulse prop band as illustrated in FIG. 10B. Each energy packet 130 proportionally decreases in energy level as the current position moves closer to the desired position. Given a set of conditions, the motion produced by an energy packet is proportional to the energy level of the packet. Thus, the following equation describes how the energy level of a packet, Ep, can be determined, where:

pC defines the current position at the time an energy packet is to be delivered
pD defines the desired position
pB defines the pulse prop band, being 2 times ICV
Ef defines the maximum fractional energy level for a pulse sequence $$Ep = \frac{Ef(pD - pC)}{pB}$$

The maximum fractional energy level, Ef, is inversely proportional to the difference between the desired resolution and the actual motion produced by a given pulse sequence; that is, when the motion produced exceeds the desired resolution, Ef is decreased. In theory, Ef could be adjusted after each pulse sequence by proportionally adjusting Ef according to the motion produced, and the calculation for Ep could be modified as follows, where:

r defines the desired resolution
mP represents the measured motion from the previous pulse sequence $$Ep = \frac{Ef(pD - pC)}{pB} \cdot \frac{r}{mP}$$

Note that the above equation has the effect of changing Ep in a manner that strives to bring the value of mP to be equal to r, thus leaving the original equation. However, in actual practice, it is not desirable to constrain mP to the value of r when the current position is near the edge of the prop band. Further, the small motions produced by a pulse sequence are not necessarily repeatable, so adjusting Ef in finite increments provides a more stable operation. Adjusting Ef in finite increments has the effect of averaging the r/mP term. The amount of the finite increment becomes a compromise between desired stability of operation versus the amount of time required to make a complete adjustment to Ef. In this way, the invention controls the rate at which the energy level changes from one pulse sequence to the next.

Figure 10C:
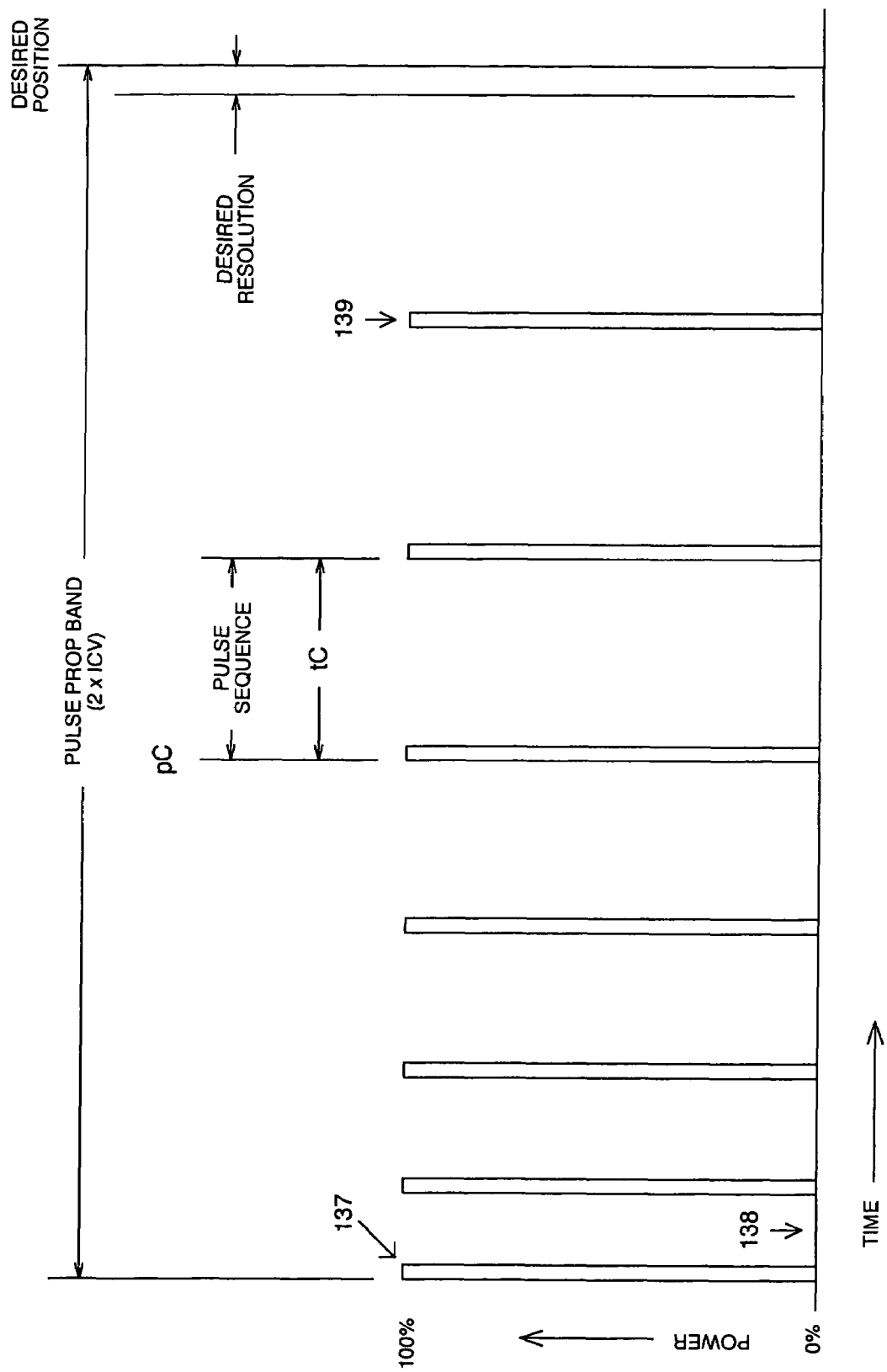
FIG. 10C is a power vs time diagram, focusing on the pulse prop band interval also shown in FIGS. 10A and 10B.
Figure 10D:
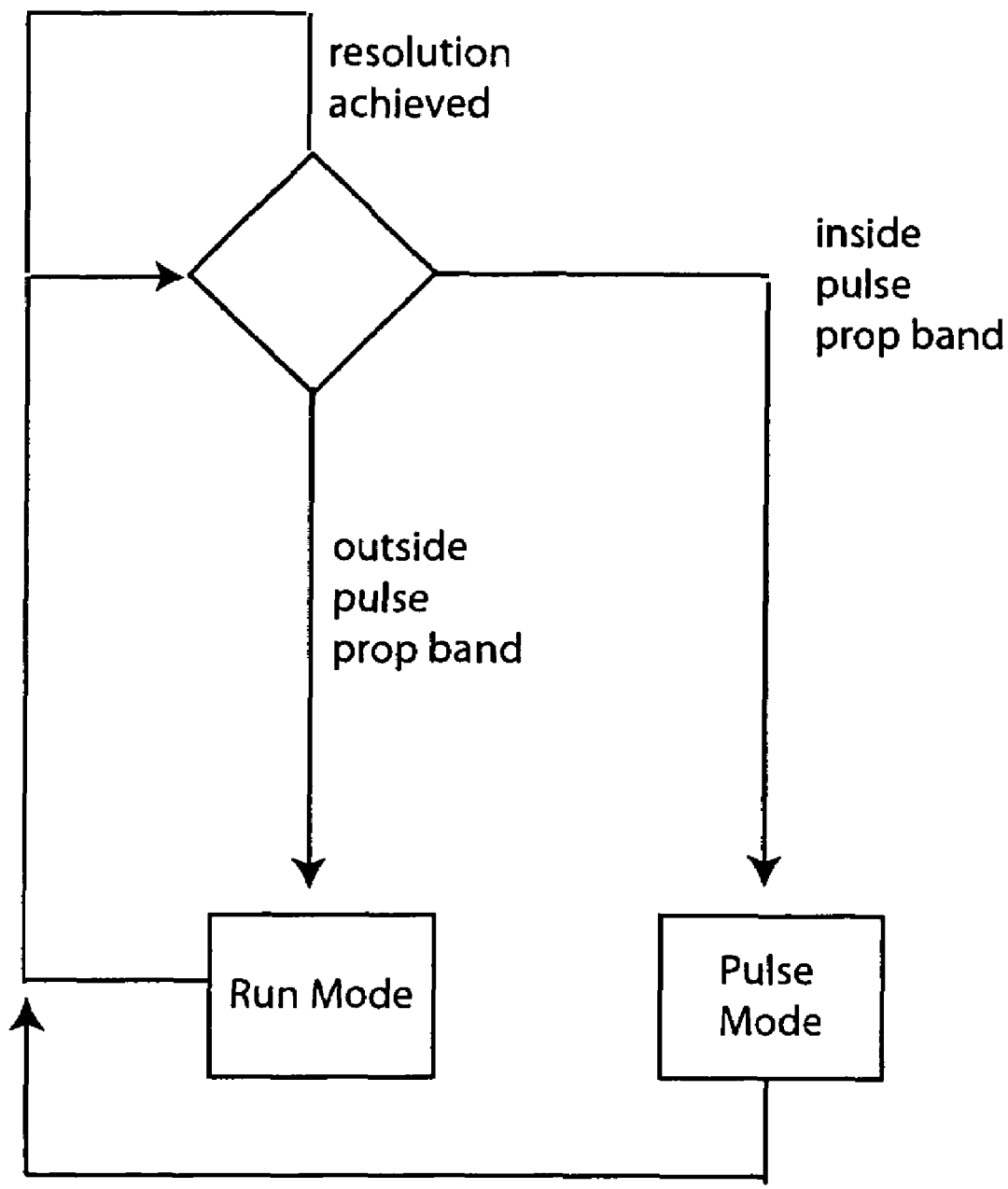
FIG. 10D is a flow diagram useful in understanding the operation of the control algorithm illustrated in FIG. 10.

Since energy is a function of power and time (i.e., E=P×t), FIG. 10B, showing energy vs. motion, can be viewed in terms of power vs. time, as illustrated in FIG. 10C. The combination of a power pulse 137 and its following off time 138 constitutes the associated energy packet 130 shown in FIG. 10B. Since the energy level of a given packet is equal to the ratio of the power pulse on time and the total pulse sequence time, explains why a pulse sequence is a single entity that cannot be interrupted once started.

Note that the pulse sequence time, tC, increases as the current position, pC, approaches the desired position, while the power pulse on time remains constant. While varying the power pulse on time with a constant pulse sequence time would have a similar effect, this would unnecessarily make the algorithm unresponsive when the current position is near the edge of the pulse prop band. This is because the pulse sequence time would be dictated by the longest pulse sequence, 139, being the nearest to the desired position.

Referring to FIG. 10C, the power pulse 137 and its off time 138 determine the value of Ef in FIG. 10B. Thereby, the energy level of each subsequent pulse sequence is effectively established by controlling the pulse sequence time, tC. With this technique, incremental adjustments to the power pulse on time, as described in Table 2 (see section below, captioned, "Adaptive pulse sequence"), effectively adjusts the value of Ef as described earlier.

The previous formula for Ep can now be described in terms of tC, where:

pC defines the current position at the time an energy packet is to be delivered
pD defines the desired position
pB defines the pulse prop band, being 2 times ICV
tD defines the maximum pulse sequence time
tB defines the minimum pulse sequence time $$tC = tD - \frac{(tD - tB)(pD - pC)}{pB}$$

The maximum pulse sequence time, tD, depends on the range of actuators to be used with the algorithm, where tD is the longest time period required for motion to stop after applying the smallest energy packet represented by the pulse sequence 139. The power pulse on time is dictated by the amount of time required to produce a motion that is consistent with the desired resolution. The minimum pulse on time for a given actuator is defined as the minimum time required to produce motion. If the minimum pulse on time produces a motion that is greater than the desired resolution, the algorithm will detect this after the pulse sequence 139 and will adjust the resolution parameter accordingly. In this way, the algorithm determines if a given actuator is not capable of achieving the desired resolution, and then compensates for best performance.

The minimum pulse sequence time, tB, which occurs at a position equal to the desired position less ICV, is primarily selected for performance, providing that the maximum power pulse on time is less than tB. This insures that a pulse sequence energy packet is less than 100%. In the preferred embodiment, it is intended to maintain low duty cycles in the pulse mode to minimize motor heating, and therefore uses a minimum tB of 46 half cycles with a maximum pulse on time of 14 half cycles, thus yielding a maximum duty cycle, or Ef, of 30%. Other applications may prefer faster response times, and therefore could use a higher duty cycle resulting in a higher Ef.

Pulse Acceleration Mode

Referring to FIG. 10B, each energy packet produces a proportional amount of motion. However, sudden increases in load on the actuator could cause little or no motion. To allow the algorithm to respond quicker to such conditions, the pulse acceleration mode is invoked, which temporarily increases the effective Ef value, by increasing the power pulse on time, with each subsequent pulse sequence until a minimum amount of desired motion is achieved. Once such motion is achieved the original Ef value is restored.

Backlash Compensation

The amount of backlash in the actuator mechanism determines how rapidly the pulse acceleration mode can increase the power pulse on time from one pulse sequence to the next. The rate of adjustment to the power pulse on time is described in below.

Start Position

In order to make the required motion measurements, the algorithm must be able to compare the change in position from the start of an operation to the end of the operation. Referring to FIG. 10, the start position block basically represents stored information. The microprocessor controls when a given operation is to start and saves the start position. If a run sequence is started, current position information is saved directly. If a pulse sequence is started, the filtered position information from the resettable integrator is saved.

Motion Processor

The motion processor also monitors both the current position information as well as the filtered position information. At the end of an operation, the microprocessor selects the appropriate position information input to be compared to the previously saved start position. The difference between the two then represents the measured motion of the operation, and that information is then passed to the run sequence processor and the pulse sequence processor.

Polarity Detection

Since the microprocessor will know which output is enabled during a given operation, the motion processor can determine the polarity of motion associated with a given output. Since motion is merely the difference between the current position and the start position, the polarity of the calculation represents the polarity associated with the given output. Simply put, if the first direction is enabled and the motion processor calculates a positive motion (the current position is greater than the start position), then the polarity of the first direction output is said to be positive. Since by definition the second direction causes motion in the opposite direction, the motion processor would calculate a minus polarity for the second direction.

Since a pulse sequence does not produce 100% energy packets, it would be susceptible to backdriving motions from a load. Such backdriving motions would cause the motion processor to calculate an incorrect polarity. For this reason, polarity measurements are disabled during the pulse mode. The polarity output presented to the direction control block will always represent the last known polarity calculated by the motion processor.

Stall Detection

In the process of calculating motion polarity, the algorithm can also detect a stall condition. When the difference between the current position and the start position does not result in a specific amount of motion after a given period of time, the actuator is considered to be stalled. The amount of motion required will depend on the slowest actuator that is intended to be controlled, while the amount of time allotted depends on the maximum stall period that can be tolerated by the intended range of actuators. To insure integrity of the polarity calculation, the polarity output is not updated unless the required motion is detected.

Once a stall is detected, the microprocessor will disable further operations to the associated output and will save the position at which the stall occurred in the start position block. The stalled output will be enabled again when the motion processor detects the required motion. The required motion can be attempted by operating the other direction, or by manual operating the actuator with a mechanical or electrical means. Mechanical manual override means are a common feature on many actuators, while electrical manual operation is an additional feature designed into the preferred embodiment.

Direction Control

The direction control block is a static calculation that determines which of the outputs needs to be enabled to produce motion in the correct direction. By monitoring the desired position, the current position (direct or filtered), the polarity information from the motion processor, and the configured open and closed positions, Fo and Fc, the correct output can be determined.

Since the command signal by definition is a relative value, where 0% signal represents the closed position and 100% signal represents the open position, the command signal by itself does not provide an absolute desired position that can be compared to the current position information. The direction control block must first convert the command signal value to the appropriate desired position, pD, using the following equation, where:

c represents the command signal value in percent (numerical 0 to 1)

Fo defines the configured open position

Fc defines the configured closed position $$pD = c(Fo - Fc) + Fc$$

Note that Fo could be greater than or less than Fc and still yield the correct absolute position, pD. In this way, the invention provides for forward or reverse acting without the need for rewiring.

The polarity information from the motion processor is essentially a single bit and can be mathematically described as follows, where:

pC defines the current position caused by motion from the first direction pS defines the start position of the motion measurement $$\text{polarity} = \frac{(pC - pS)}{|pC - pS|}$$

Note that the equation can only yield a result of +1 or −1, where +1 indicates that the first direction will cause pC to increase. Conversely, a −1 result indicates that the first direction will decrease pC; which means that the second direction will cause pC to increase.

Once pD is calculated, the desired polarity dictated by the command signal can be calculated as follows, where:

pD defines the absolute desired position according to the command signal, c pC defines the current position $$\text{desired polarity} = \frac{(pD - pC)}{|pD - pC|}$$

Again this equation yields a result of +1 or −1, where +1 indicates that pC must increase to reach the desired position, pD. Conversely, −1 indicates that pC must decrease.

The direction output of the direction control block, also a single bit, then becomes the product of the two previous equations, where:

a +1 result indicates that the first direction is to be enabled
a −1 result indicates that the second direction is to be enabled $$\text{direction} = \frac{(pC - pS)}{|pC - pS|} \cdot \frac{(pD - pC)}{|pD - pC|}$$

In this way, the invention provides automatic polarity, which means that the connections to the first and second direction outputs could be reversed without having to reconfigure the open and closed positions. Further, the connections to the feedback potentiometer could also be reversed, and the equations would determine an appropriate relationship between the outputs and the feedback potentiometer; this eliminates two wiring possibilities that render conventional positioners non-functional. However, the open and closed positions would need to be reconfigured since all absolute position values are in reference to the feedback potentiometer.

Noise Rejector

The noise rejector blocks eliminate random signal changes to the command and feedback potentiometer signals as described below.

Resettable Integrator

The resettable integrator blocks filter their associated signals to provide interpolated high resolution values for use with the pulse mode as described below. The weighted average calculation performed by the integrator is as follows, where:

a represents the running average
s represents the newest sample from the noise rejector
f represents the filter rate, or the number of samples used in the average $$a = \frac{a(f-1) + s}{f}$$

The value of f is selected according to the maximum pulse sequence time, tD, determined for the pulse sequence processor. When the value of s changes from one value to another, the weighted average, a, must equal the value of s within the maximum pulse sequence time. Based on the frequency at which new values of s are acquired, a value for f can be determined.

Position Output Processor

Since the algorithm processes absolute position values, the direction control block needed to convert the command signal to an absolute desired position value. Inverse to this, users require a position signal, Op, to be a similar relative value as the command signal, 0 to 100%. The position output processor converts the absolute position value, Fp, to an appropriate value for Op as is discussed below.

The position output processor allows the user to calibrate the output, Op, for any desired signal range, forward or reverse acting. The unique feature of the invention is that the calibration is not effected, or is independent of, the configuration of the control algorithm. In other words, the configured open position, closed position, forward acting outputs, or reversing acting outputs can all be changed without effecting the user's calibration of the position output.

Having now described the presently preferred kinematic control techniques, other aspects of the digital high resolution controller will now be presented.

Electronic Braking

In a conventional system, resolution is primarily determined by the deadband setting of a positioner. Braking systems are sometimes used in conventional systems to control deadband. However, as discussed above, the preferred control algorithm dispenses with the need for a conventional deadband by relying on measured inertial factors. Nevertheless, in some applications, it may be desirable to implement a brake to minimize the coast of a motor and thereby provide a more consistent kinematic operation. For example, in some of the preferred embodiments illustrated, an electronic braking method has been used to help achieve resolutions below 0.5°. The presently preferred embodiments may use a variety of different braking techniques. Two electronic braking techniques are illustrated in FIGS. 4 and 5.

Figure 1:
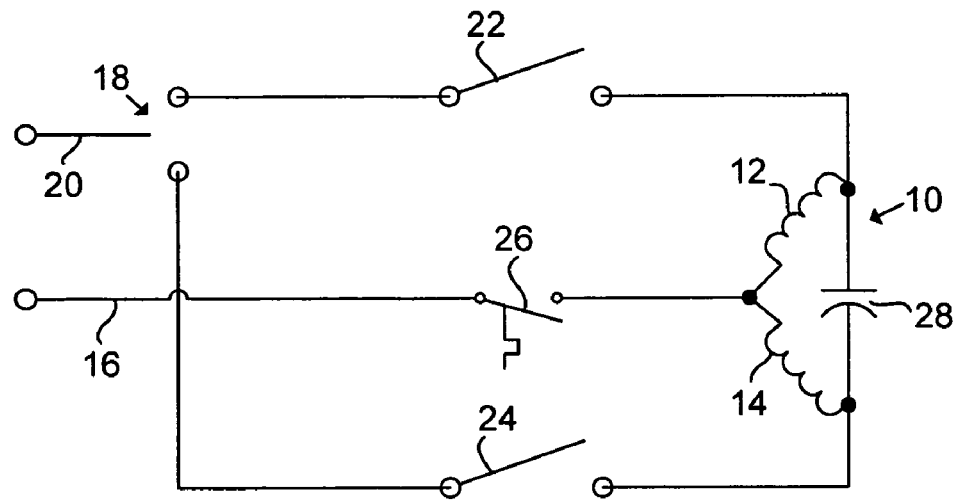
FIG. 1 is a schematic diagram of a prior art AC split phase motor.
Figure 2:
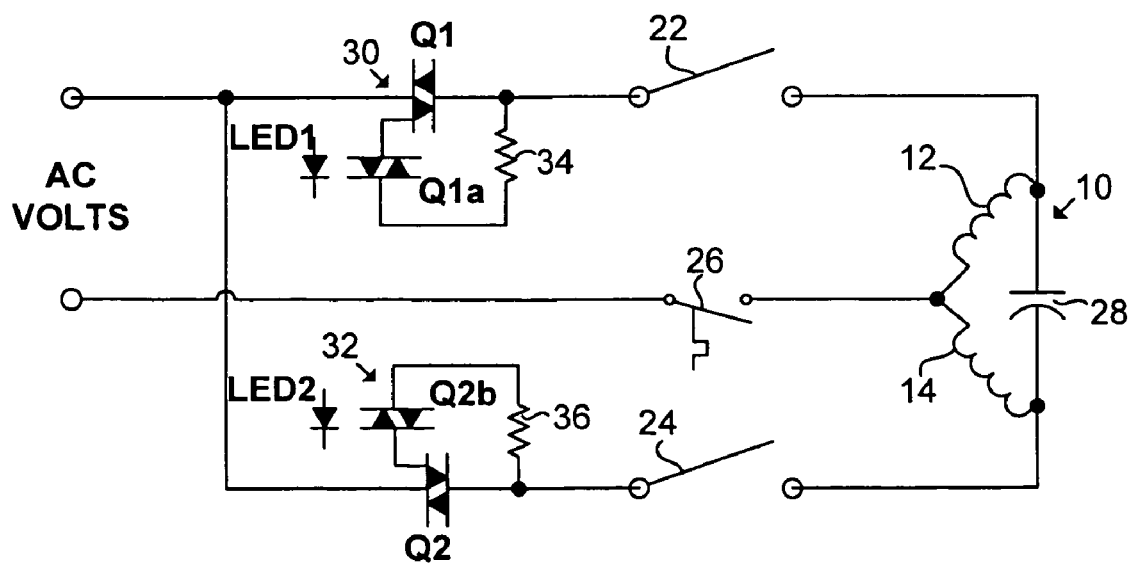
FIG. 2 is a schematic diagram of a prior art triac control circuit.
Figure 3:
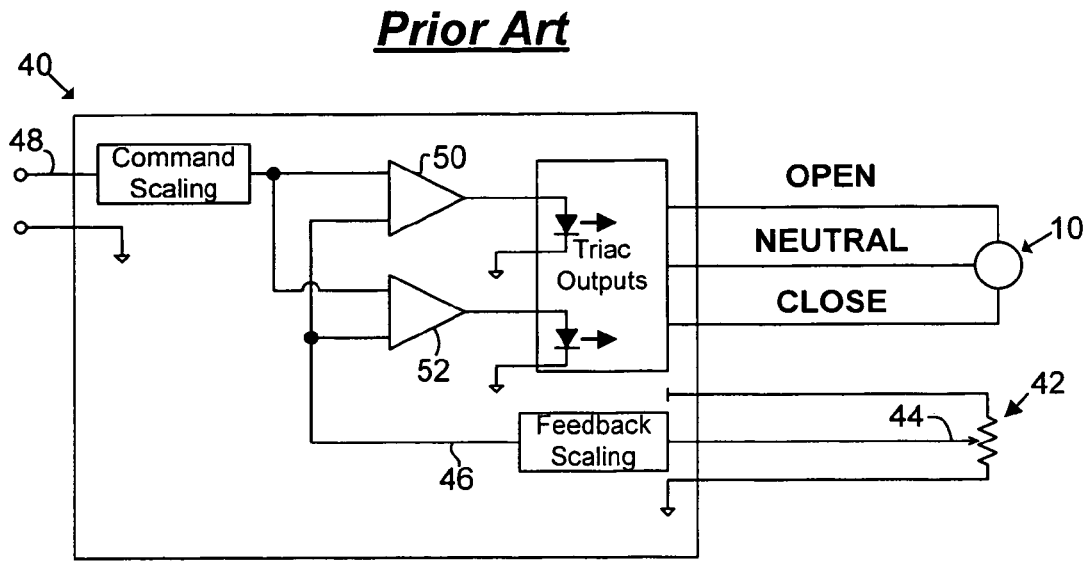
FIG. 3 is a schematic block diagram of a prior art positioner.
Figure 4:
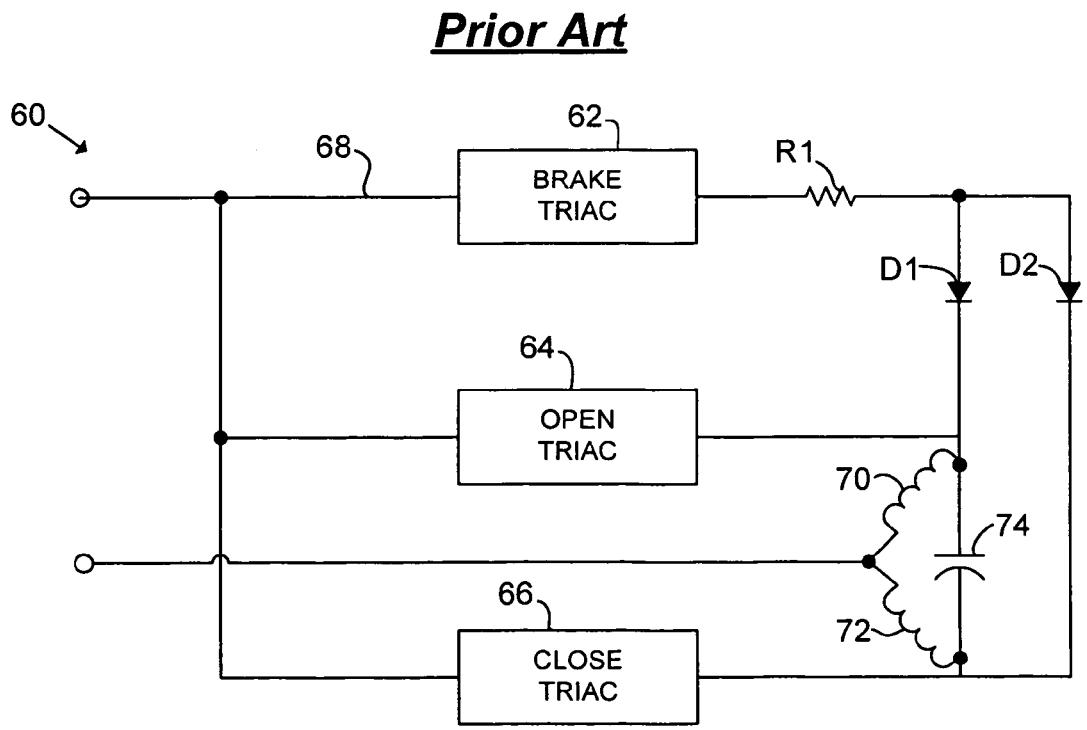
FIG. 4 is a schematic block diagram of a prior art electronic brake circuit.

Referring now to FIG. 4, an electronic braking circuit 60 for a positioner includes a brake triac 62. When open triac 64 and close triac 66 are turned off to stop the motor, the brake triac 62 is turned on for a short period. For example, the brake triac 62 may be turned on for 100 to 400 milliseconds. The brake triac 62 applies the AC line voltage 68 to both motor windings 70 and 72, which has the effect of putting equal potentials across opposing motor windings 70 and 72, thus generating opposing magnetic fields that rapidly stops motor rotation. To prevent permanent shorting of the motor, diodes D1 and D2 are used; this however allows only every other half cycle of the AC line 68 to be applied for braking. While this reduces the braking effect, the end result still outperforms a mechanical brake. Applying equal potential to both windings 70 and 72 has the adverse effect of placing a zero potential, or a short, across the motor capacitor 74, which causes the capacitor 74 to rapidly discharge. The high discharge current may damage conventional triac devices, and hence, power resistor R1 is implemented to limit the surge current through the brake triac 62.

Figure 5:
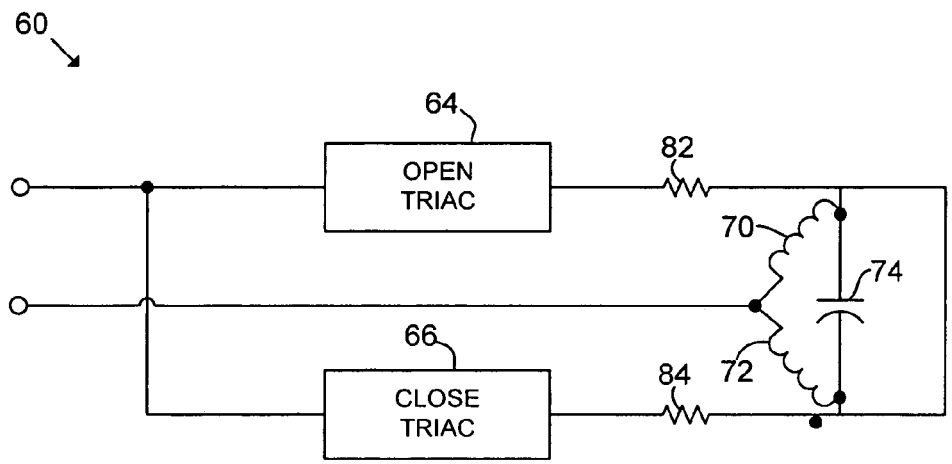
FIG. 5 is a schematic block diagram of an improved electronic brake circuit.

In an improved electronic braking circuit 60 as shown in FIG. 5, the primary triacs 64 and 66 perform a braking function, eliminating the need for the braking triac 62. Turning on both of the primary triacs 64 and 66 performs the same function as the brake triac 62. While this has the added benefit of applying a full cycle of the AC line 68 for braking, the discharge current from the capacitor 74 would damage one or both of the triacs 64 and 66. To limit the discharging surge current, power resistors 82 and 84 are added in series with each triac 64 and 66. However, this has the adverse effect of reducing the torque output of the motor during normal operation.

Rather than generate opposing magnetic fields, the preferred embodiment approaches the task by generating opposing forces using the existing primary triac circuits. During normal operation, the charging and discharging surge currents of the motor capacitor are naturally limited by the resistance of the unpowered winding, thus eliminating the need for an additional surge limiting power resistor. The invention takes advantage of this fact by implementing an algorithm that generates the waveforms illustrated in FIG. 6. The waveforms include an open run sequence 92 on an open winding 94, a close winding 96, and a brake sequence 98. At the end of a normal operating sequence such as the open run sequence 92, the algorithm applies the next half cycle 100 of the line to the opposite motor winding and continues alternating subsequent half cycles to the two windings. The algorithm uses each half cycle to rapidly alternate the motor rotation where the motor eventually comes to rest somewhere between the two rotational positions. Since coasting is caused by a large inertial force in one direction, this technique balances the inertial force in both directions so as to leave the motor at rest when the primary triacs are turned off.

The number of braking half cycles required to bring the motor to rest is equivalent to the number of half cycles required to start the motor during the in-rush period. Additional half cycles merely continue the alternating motion with no improvement or degradation in the resulting coast. Since actuator motors used in the intended application typically have an in-rush period of 100 msec, the electronic braking circuit of the preferred embodiment applies a fixed braking time period consisting of 14 half cycles, equating to 117 msec at 60 Hz and 140 msec at 50 Hz.

Figure 6:
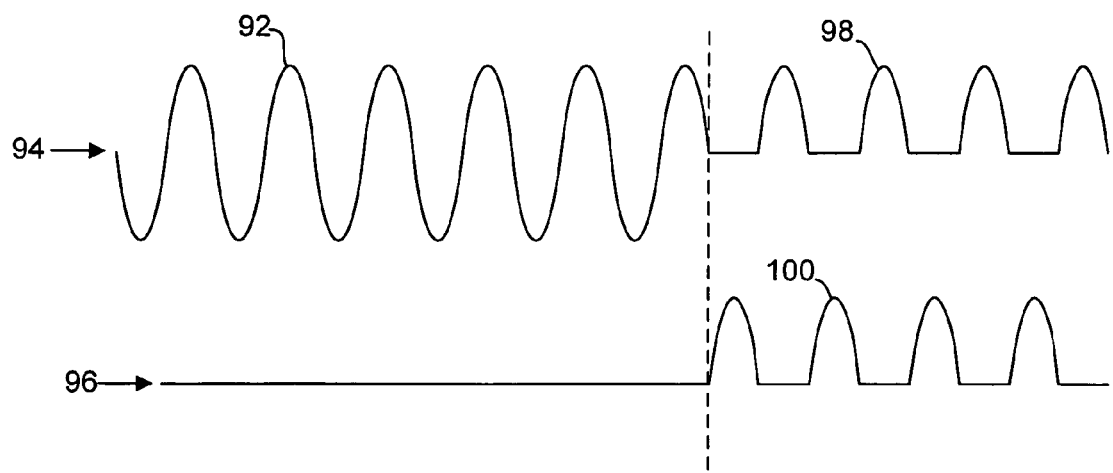
FIG. 6 is a waveform diagram illustrating the brake sequence of a preferred embodiment of the invention.

The electronic brake sequence also works with actuators that use a mechanical brake to prevent backdrive. Brake solenoids are not polarity sensitive, so the brake sequence waveform 98 as shown in FIG. 6 maintains power to the brake solenoid, which keeps the mechanical brake disengaged. Since the brake sequence provides the actual braking of the motor, the frictional wear on the mechanical brake is dramatically reduced. The mechanical brake is only used to hold back the backdriving force, which does not produce frictional wear caused by the motor shaft rotating against the brake material.

Adaptive Control

Braking provides one key improvement to achieve higher resolution by providing less coast, which allows the control algorithm to achieve the desired position in a timely manner. Without braking, the algorithm would require using fractional power for much longer periods of time; this may not be practical in some applications. Electronic braking provides a smaller and more consistent coast. In contrast, a mechanical brake will change its braking characteristics with temperature and wear. Further, a mechanical brake applies a braking force that is independent of the inertial force of the motor, so AC line voltage variations that vary the inertial force of the motor will affect the performance of a mechanical brake. The electronic brake sequence described in FIG. 6 uses the same AC power source that operates the motor to generate the braking force. Therefore, the electronic braking force varies with conditions in the motor, thereby providing consistent performance.

In practice, differences in the two motor windings will not generate identical forces, and the motor will tend to coast a small amount after both triacs are turned off. Further, the wide range of motor designs and actuator designs can vary the performance of the electronic brake. For example, two second actuators, which have a low gear ratio to the output shaft, commonly coast 30° or more without any braking. A mechanical brake could reduce this coast to 5°, while the electronic brake sequence can reduce this coast to 2° or less. Conversely, a 90 second actuator having a high gear ratio to the output shaft may reduce coast to 0.5° using a mechanical brake, while the electronic brake sequence can reduce the coast to 0.2°.

With such a wide range of performance, other compensation is necessary in order to provide consistent performance over the range of different types of actuators. While the invention could be configured with specific compensations for specific actuators, this practice would result in a multitude of "customized" positioners that would not be interchangeable, and would not be able to adapt to changes in an actuator's characteristics caused by load variations or actuator wear. The positioner could be designed with an array of settings, such as with switches or trim potentiometers, that would allow a common positioner to be configured for a specific actuator type. This approach results in complicated setups, and while providing interchangeability, the positioner needs to be configured each time it is placed in a different actuator. Further, this approach still does not address variations due to load or wear.

As has been shown, the preferred embodiments provide adaptive techniques that measure key characteristics of the actuator and its load, and then automatically, and continuously, adjust settings used to compensate for such characteristics. The algorithms measure or interpolate key characteristics of the actuator using the existing feedback potentiometer as the only sensor.

In one preferred embodiment, a resolution of 0.2° based on application needs and capabilities of commonly available actuators is desired. This means that the positioner must achieve a commanded position to within 0.1°, or in other words, a maximum deviation of 0.1°. It should be understood that the techniques described herein could be modified to accommodate different kinds of actuators (such as pneumatic and DC motor actuators) and a different range of applications requiring different resolutions.

Ultimately, the resolution of an actuator will be limited to the smallest angular rotation that can be made by the motor. Actuators can experience rapid oscillating backdrive forces that exceed the speed at which the actuator can be moved to adjust for such motions. This will have the appearance that the positioner is hunting and not able to achieve the desired resolution. The present invention detects when the actuator is not capable of maintaining the maximum deviation of 0.1° and automatically adjusts the maximum deviation parameter for best performance.

Electrically, the smallest control quantity a positioner can provide to an AC split phase motor is one half cycle of the AC line, referred to here as Hc. For the intended range of actuators, the rotational motion of the output shaft with one Hc is less than 0.1°, thus allowing the control algorithm to achieve the selected maximum deviation. The operation of "pulsing" the motor with a select number of Hc is referred to here as the pulse mode and is used to make small finite motions to correct the remaining deviation following a brake sequence. For different kinds of actuators, the pulse mode may be accomplished in a different way. For example, a DC motor can achieve small controllable motions using voltage control or pulse width modulation. Regardless of the method a positioner uses to make small motions with a given actuator, the algorithm described herein can be used.

While the pulse mode is suitable for making small motions, by definition, the pulse mode requires more time to move the actuator a given number of degrees since the motor will be off for a select number of Hc before the next "pulse" is applied. Voltage control or pulse width modulation has the same slowing down effect with DC motors. To optimize normal operation of an actuator, the invention uses two modes of motor control, one called a run sequence, and the other a pulse sequence. The run sequence merely applies power to the desired motor winding to perform larger, faster motions.

Inertial Compensation

Figure 7:
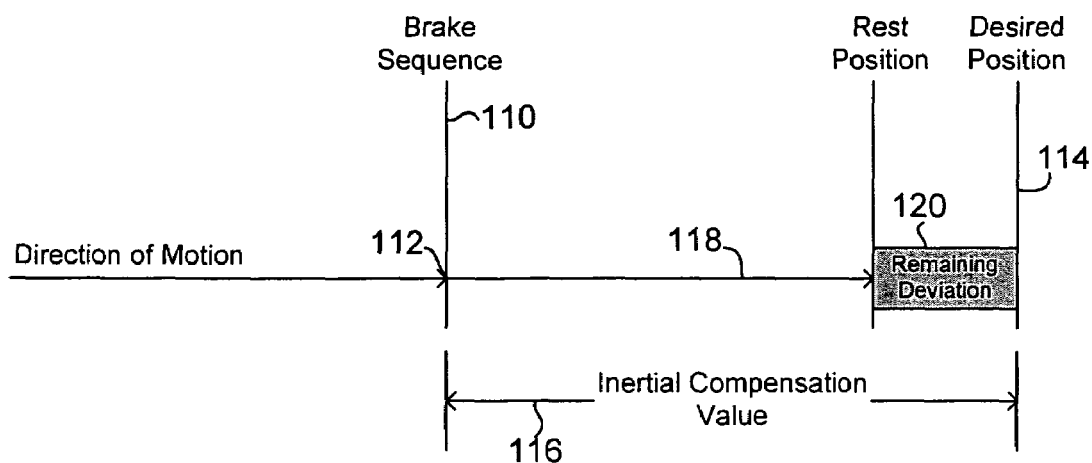
FIG. 7 is a timing diagram depicting kinematic concepts involved in the control algorithm.

Referring now to FIG. 7, at the end of a run sequence, a positioner turns off the motor (presumably at a desired position). Regardless of what type of brake (mechanical or electronic), if any, is used, the motor continues to move, which then defines the deadband. The positioner measures the coast and uses the measurement to automatically set the deadband setting, which dictates when the motor can be turned on again. This feature basically replaces the need for a deadband setting that normally is set manually, but does nothing to reduce or eliminate the existing deadband. In contrast, the present invention measures the coast of the motor and uses the measurement to adjust control of the motor to eliminate deadband. This is referred to as inertial compensation.

By measuring the motor coast, the invention turns the motor off at a point before the desired position is reached and uses the motor coast to complete the motion. However, the specific amount of coast from one run sequence to another can vary depending on the direction of motion, variations in the actuator mechanics, or variations in the load. To avoid erratic operation, a nominal or typical coast value is determined and any remaining error is corrected using the pulse sequence. While the coast value for each direction could be separately measured and accounted for, the typical difference is negligible. To reduce the burden of compensating for inertial motion in both directions, the actuator controller of the present invention determines a coast value that represents an average of the two and is referred to as the inertial compensation value.

FIG. 7 illustrates the key events of a run sequence. The algorithm ends a run sequence by applying a brake sequence 110. This is done at a point 112 that is the equal to a desired position 114 less an inertial compensation value 116. The algorithm then measures the resulting motor coast 118 which is then used to adjust the inertial compensation value 116. In practice, it would not be prudent to merely adjust the inertial compensation 116 to the motor coast value 118, but rather calculating an average value of several moves avoids erratic operation from one run sequence to another. Since averaged values change slower as the number of sampled moves is increased, the number of samples used is selected for a specific range of applications.

The actuator controller uses simple logic operations to determine the average inertial compensation (ICV) value 116 and follows the truth table shown in Table 1. The actuator controller detects when the coast 118 overshoots the desired position 114 and automatically increases the ICV value 116. This adds a bias to the ICV value 116 that prevents overshoot. The effective number of samples used in determining the "average" is controlled by the amount that is added to, or subtracted from, the ICV value 116.

TABLE 1

Inertial Compensation Value Truth Table

| | |
|---|---|
| Measured Coast > ICV | add 0.1° to ICV |
| Measured Coast < ICV | subtract 0.1° from ICV |
| Overshoot | add 0.1° to ICV |

Referring to FIG. 7, a new run sequence can theoretically start as soon as a new position is desired. At first glance, it may seem that this is not possible since the next resulting motor coast would cause a certain overshoot if the new desired position is only 0.1° further away. While the algorithm will turn the motor on to start a run sequence, the inertial compensation will initiate a brake sequence one Hc later. The inertial motion of only one Hc will result in little, if any, motor coast. This means that any coast is solely dependent on the imbalance between the two motor windings when the brake sequence is initiated.

The electronic brake sequence alone is able to reduce motor coast to a range of 0.2° to 2° over the intended range of applications. Adding inertial compensation to the electronic brake sequence, the actuator controller is able to reduce the resultant deviation to a range from 0.1° to 0.4°.

Adaptive Pulse Sequence

A pulse mode may be used to improve resolution of a positioner. For example, a controller may switch to a pulse mode at a position prior to reaching the desired position. The pulse mode turns the motor on and off at a specific rate, which reduces the inertial force of the motor thereby reducing coast. Alternatively, a controller may pulse the motor with a specific number of Hc until the deviation is reduced in half. Both methods perform the function of slowing the motor to reduce coast, and then using the resulting deadband to determine when the next motor operation can begin.

Rather than using deadband to determine the next motor operation, the invention uses an adaptive pulse sequence that operates the motor to achieve a specific deviation, or resolution. This technique allows the positioner to provide a specific resolution regardless of actuator type or its application. Rather than specifying resolution for a given actuator or application, a positioner using the adaptive pulse sequence would specify a range of actuators that can be used to achieve the desired resolution. To prevent unstable operation, the actuator controller has an additional feature that detects when an actuator is outside of its specified range and adjusts the resolution parameter accordingly.

In order to avoid interference between the run sequence and the adaptive pulse sequence, the run sequence is disabled at the time the adaptive pulse sequence is enabled. The actuator controller switches between the two modes when the difference between the current position and the desired position is twice the ICV value. This method ensures stable operation of the run sequence while allowing the switch point to vary for a given actuator. For example, an actuator that has an ICV value of 4° would switch to the pulse sequence at a point that is 8° from the desired position.

Figure 8:
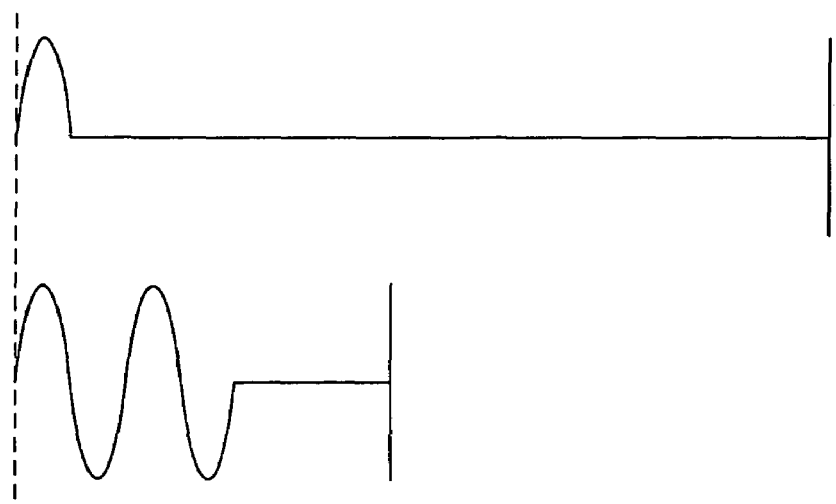
FIG. 8 is a pulse sequence waveform diagram.

To adapt a given actuator, the invention continuously adjusts three key parameters of the pulse sequence to obtain a small enough motion to be consistent with the desired resolution. A given pulse consists of a specific number of Hc on, followed by a specific number of Hc off. Referring to FIG. 8, the amount of motion produced by a pulse increases as the number of Hc on increases and the number of Hc off decreases. The adaptive pulse sequence adjusts the number of Hc on, the number of Hc off, and the rate at which the pulse is adjusted for smaller or larger motions. Since the series of Hc that make up a pulse creates a single entity, the algorithm intentionally prohibits any other motor operation (e.g. a run sequence) from interrupting the complete series of Hc. A new motor operation, whether another pulse or run sequence, may begin after the last Hc off.

The number of Hc on ultimately determines the specific amount of motion the motor will produce. The number of Hc off basically determines how fast the combined motions of multiple pulses will approach the desired position. If the desired position is far away, pulses can be applied more frequently. In order to maintain stable control as the desired position is approached, the frequency of the pulses is reduced. Since the range of operation of the adaptive pulse sequence is twice the ICV value, the algorithm proportionally varies the frequency of pulses from a maximum frequency at the 2×ICV position to a minimum at the desired position. The 2×ICV range is therefore referred to as the pulse prop band, and the pulse prop band is used to effectively adjust the number of Hc off.

At the end of each pulse period (following the last Hc off), the algorithm measures the actual motion produced. Based on the amount of motion produced by a given pulse, the number of Hc on is then adjusted to either increase or decrease the amount of motion for the next pulse. The goal is to determine the number of Hc on that is required by a given actuator and its load to produce a specific finite motion that is consistent with the desired resolution. Since the specific motion produced by a given pulse can vary from one pulse to the next, more stable operation is achieved if the Hc on parameter value is based on an average motion of multiple pulses. The actuator controller uses the truth table shown in Table 2. Since the target deviation of the actuator controller is 0.1°, the number of Hc on is not changed as long as the average pulse motion ranges from 0.05° to 0.1°.

TABLE 2

Hc on Parameter Truth Table

| | |
|---|---|
| average pulse motion < 0.05° | increase Hc on by 1 |
| average pulse motion > 0.1° | decrease Hc on by 1 |

When the actuator encounters a sudden increased load, the motion produced by a given pulse will dramatically reduce. While the algorithm described above would eventually adapt to this new condition, the slow response due to averaging would result in a long period of little motion. To improve the response to such a condition, the algorithm implements a pulse acceleration mode. When the specific motion (rather than the average motion) produced by a pulse is less than some minimum (0.05° in the preferred embodiment), the pulse acceleration mode is initiated, and the Hc on parameter is increased by one Hc. The acceleration mode continues to add one Hc after every pulse until the specific motion measured exceeds the minimum. Once the minimum motion is achieved, the algorithm terminates the acceleration mode and restores the original Hc on value. While in the acceleration mode, the algorithm suspends calculation of the average motion since the measured motions are not the result of the original Hc on value.

Gears used to couple the motor shaft to the output shaft inherently have backlash. The backlash creates a condition that produces no motion in the output shaft even though motion is produced in the motor shaft, and hence would trigger the pulse acceleration mode. Since this lack of motion is not due to an actual load condition, the pulse acceleration mode may increase the Hc on value so high that when the gears finally engage, the motion produced may be far greater than desired. To adapt to this condition, the algorithm employs backlash compensation.

Backlash compensation adjusts the rate at which the Hc on value is increased during the acceleration mode based on the ultimate motion detected. Rather than arbitrarily increasing the Hc on after every pulse, the Hc on value may be increased every other pulse depending on the amount of backlash compensation that is required. Alternatively, the Hc on value may be increased at any predetermined number of pulses, such as once every 30 pulses. The actuator controller implements the invention by adjusting the backlash compensation value (which represents the number of pulses per acceleration step) according to Table 3. When the acceleration mode terminates due to a detected motion, the amount of motion detected is used to determine how to adjust the backlash compensation value.

TABLE 3

Backlash Compensation Value Truth Table

| | |
|---|---|
| pulse motion < 0.1° | decrease backlash by 1 |
| pulse motion > 0.15° | increase backlash by 1 |

In summary, the run mode (using an electronic brake sequence with inertial compensation) is used to approach the desired position at maximum possible speed reaching a position that is well within the pulse prop band, at which time the pulse mode is enabled. As the command signal changes the desired position, the pulse mode remains enabled until the desired position is outside the pulse prop band, at which time the run mode is enabled again, and the process is repeated.

Once a positioner implements the features described above, high resolution control of the actuator becomes possible. However, high resolution control is of little value if the resolution of the feedback potentiometer signal measurement does not match this capability. While a digital signal can provide a precise command value, analog command signals also need to be measured with high resolution. For example, the actuator controller of the preferred embodiment makes measurements less than 0.05° in order to perform the control algorithms for its desired resolution of 0.2°. Over the range of a quarter turn actuator (90°), 0.05° represents only $\frac{1}{1800}$th, or 1800 digital counts, which requires an 11 bit analog-to-digital converter (ADC). Matters are further complicated by the fact that only a portion of the feedback potentiometer's range is used (typically ½ to ⅓). This means that a 12 bit ADC or better is required.

Most digital positioners make use of embedded ADC systems available in many microcontrollers. However, these ADC systems normally provide only 8 bit (256 counts) resolution, while some are now available with 10 bit (1024 counts) resolution. While such positioners could still implement the control algorithms of the invention, the attainable resolution could be just as easily achieved using traditional deadband dependent control. Separate 12 bit ADC integrated circuits are available. However, these devices are quite costly and require substantial support circuitry, which adds errors to the measurement. To offset the errors, the ADC will need more than 12 bits of resolution. Devices that provide more than 12 bits of resolution are far more costly and have long conversion times that would not provide the control algorithm with a fast enough measurement.

Therefore, unique ADC filter algorithms to complement the high resolution control algorithms are required. A run sequence used primarily for coarse positioning requires faster feedback measurements due to its fast speed. In contrast, a pulse sequence requires high resolution measurements, but it does not require fast measurements due to its slow speed. On this premise, the invention implements a 2 stage ADC. The first stage provides fast yet lower resolution, which then feeds the second stage providing interpolated high resolution at a slower speed.

While separate ADC devices could be used with the 2-stage ADC algorithms, the preferred embodiment implements a discrete circuit utilizing a single slope converter comprised of a dual op amp, an analog multiplexing device to select multiple signals, and simple resistor network to scale signals. By using the embedded timer in its microprocessor, the actuator controller provides a 13 and ½ bit measurement of each of the signals (feedback potentiometer, command, a reference voltage, and signal ground) every 12 msec, which is less than one cycle of the AC line. This approach uses less space, consumes less power, eliminates amplifier errors, provides twice the resolution, and costs less than ¼ the cost of typical ADC devices.

Each measurement is then scaled according to the reference voltage and signal ground measurements to provide what is referred to as the instantaneous readings. The instantaneous readings are used by the run mode since they provide fast readings with sufficient resolution. To provide consistent and stable high resolution positioning, the pulse mode requires stable high resolution ADC readings. To accomplish this, the instantaneous readings are processed by two filter algorithms, one to stabilize the readings to nearly 16 bit values, and the second to reject electrical noise within the positioner as well as electrical noise induced from other sources.

The first filter algorithm employs a running average technique, which calculates an average of several readings and behaves in a manner similar to a filter capacitor. The mathematical calculation not only eliminates the need for a filter capacitor, but also emulates very large capacitance values that would not be practical to implement with actual filter capacitors. Further, the mathematical approach is not susceptible to variations in temperature and degradation over time, as is the case with filter capacitors.

While a running average provides a better solution to using a filter cap, both exhibit a common problem for the application. Selecting larger filter values (i.e., the number of samples used to calculate the average) to provide a stable reading for the pulse mode causes slower response times from the filter. When the positioner switches from the pulse mode to the run mode, the running average value will lag, just as a capacitor charging or discharging would lag. Once the run mode is completed at a new position, the pulse mode would not have a true average value to function correctly for many seconds. Recognizing that a mathematical value can be reset to any value based on certain events, the inventors developed a resettable running average filter algorithm. When two consecutive instantaneous readings differ more than a certain amount, the algorithm automatically sets the running average value to the latest instantaneous reading, thus eliminating long lag times for large changes in signal. By the nature of the application, the reset running average will stabilize by the time the actuator can actually reach the new position.

To avoid inadvertent resetting of the filter, the differential in instantaneous readings is a fixed value and is relatively large. However, the pulse prop band will vary with different actuators and conditions. Since the run mode is enabled outside of the prop band, the running average is also reset whenever the run mode is engaged. While this secondary resetting event is crucial for the feedback signal, the small amount of lag time in reading a command signal only delays when the positioner starts an operation. In some cases, it may even be desirable to allow this delay to prevent rapid commands to the positioner. For this reason, the actuator controller does not implement the secondary reset for analog command signals.

Electrical noise (within the positioner or from outside sources) causes sudden changes to the signals that are very short in duration (typically one reading from the ADC) and occur at random times. Noise levels that do not exceed the differential criterion tend to vary the running average measurement at a low frequency. For example, a low frequency describes a frequency low enough that the pulse mode may follow this variation. Noise levels (usually a transient) that exceed the differential criterion would cause a momentary reset in the running average, which would trigger a momentary response from the positioner. To reject electrical noise, the invention implements a second filter algorithm that eliminates a sample reading from the average calculation if the difference between the reading and the average exceed a certain amount. To insure that the running average can follow a small actual change in signal, the new reading is used in the average if a certain number of consecutive readings persist above the differential in the same polarity.

Temperature Dependent Duty Control

In another aspect of the invention, excessive cycling in electric actuator applications can be caused by using an inappropriate actuator for a given application, but most often is the result of improperly tuned PID controllers that unnecessarily run the actuator. Excessive cycling eventually overheats the motor, regardless of its ratings, and the built-in thermal switch trips to protect the motor. Similar overheating can occur if the actuator is stalled for long periods or stalled frequently over a given period of time. While the thermal switch protects the motor, other components within the actuator may be damaged or malfunction at the high temperatures allowed by typical thermal switches. The motor itself also degrades and eventually fails with frequent thermal switch tripping.

When the thermal switch trips, the most significant consequence for the application using the actuator is the shutting down of the process being controlled. The thermal switch must cool to restore power to the motor, which can take ten minutes or more. Applications controlling volatile or hazardous materials may not be able to afford several minutes of shutdown. Therefore, the effect on a large factory system could have widespread implications.

One method to address this problem is to provide an input for an optional temperature sensor that mounts to the motor. The temperature reading from the sensor is then compared to a limit set by the user. Presumably, this limit is a lower safer temperature than the thermal switch trip point. When the set limit is exceeded, the motor is disabled until it cools. This feature prevents destructive high temperatures by functioning similar to a thermal switch, resulting in several minutes of no operation.

Another solution to this problem is to control the motor with a cycle timer function. Cycle timer units or positioners with built-in cycle timer functions are readily available and usually are used to reduce the speed at which an actuator closes a valve in order to prevent water hammer effects. A cycle timer function basically turns the motor on for a period of time (typically between 0.5 seconds and several seconds) and then turns the motor off for a period of time (typically several seconds). While this operation slows the time required to move the actuator, it has the beneficial effect of allowing the motor to cool during the off time period. Using a cycle timer function set to match the duty cycle rating of a given motor, the motor can be prevented from overheating, thereby preventing shutdowns.

The primary drawback of a cycle timer function is that it arbitrarily turns the motor on and off. When the positioner is trying to make small moves of short duration—as is expected at the process control setpoint—control becomes erratic since the motor may be on or off for any given move. A log rate positioner may be used to improve this condition. The log rate function delays the command signal using a large filter capacitor which allows the actuator to physically move faster than the filtered command signal. The effect is that the actuator moves at a logarithmic cycling rate, following the logarithmic charging curve of the capacitor. In other words, when the desired position is far away, the log rate positioner allows longer on times. Conversely, for shorter moves the on time shortens. Since the delay is governed by the command signal, its reaction to small command changes is predictable, and therefore can be accounted with PID settings.

The log rate positioner still has the undesired effect of slowing the actuator continuously, when the function is only needed a small percentage of the time. To eliminate this undesired effect, and at the same time prevent shutdowns, the present invention may use a temperature dependent duty cycle control algorithm. By monitoring the temperature of the motor with a temperature sensor, the algorithm varies the percent of duty cycle control at a rate that is inversely proportional to the temperature of the motor. The algorithm basically operates the motor at 0% duty at a high temperature limit (presumably below the thermal switch trip point), 100% duty at a low temperature limit, and proportionally varies the percent duty cycle at temperatures between the limits. The 0% duty (meaning the motor is off) output should only occur if the ambient environment already creates a temperature at or above the high limit. In practice, the motor will be controlled at a percent duty that will equalize with a specific motor temperature. To minimize erratic control at the process setpoint, the algorithm uses a cycle time of two seconds. However, since the duty control function only engages under adverse or abusive conditions, this problem is not encountered under normal operation.

Indirect Temperature Measurement

A temperature sensor provides a distinct advantage of sensing absolute temperature of the motor, including ambient temperature and load effects. Actuators are rated for a specific duty cycle at maximum load and at a maximum ambient temperature. Load and temperature specifications are relatively easy for system designers to control. However, the dynamics of PID control creates so many variables, it is nearly impossible for a system designer to know with certainty that the duty cycle rating of the actuator will be adhered to. Assuming temperature and load specifications are adhered to, duty cycle remains the primary cause for overheating and damaging actuators. With this premise in mind, the inventors developed an algorithm that indirectly measures temperature rises caused by cycling of the actuator motor. The actuator controller of the present invention uses this algorithm, instead of an additional sensor, in conjunction with temperature dependent duty control. For the intended applications, the actuator controller implements the algorithm for a range of actuators rated from 25% duty to 100% duty.

Heating of the motor is specifically caused by the electrical currents flowing through the motor windings. Since a positioner controls every Hc applied to the motor, the positioner can account for all heating caused by cycling the motor. Simply put, every Hc on period generates heat, while every Hc off period provides an equal cooling period to offset the heat from an Hc on period. Using an up/down counter, the algorithm increments the counter for every Hc on period, and likewise, decrements the counter for every Hc off period. The value of the counter at any given time will represent the cumulative effect of heat caused by on and off cycles: this value is referred to as "HCUM" and represents the indirect temperature measurement. HCUM can therefore be used in place of actual temperature readings from a sensor by the temperature dependent duty control algorithm. Instead of selecting actual temperature limits, HCUM values are selected for the 0% and 100% duty cycle points.

While every Hc off period provides a constant cooling effect, the same is not true for each Hc on period. When the motor is initially turned on, the motor draws an in-rush current for a short period of time. This higher current generates more heat than a normal Hc on period. If the motor is mechanically stalled, a higher current (less than or equal to the maximum in-rush current) is drawn, and again generates more heat than normal. The electronic brake sequence implemented by the invention creates a new source of higher current draw. Since the electronic brake sequence essentially stalls the motor, these Hc on periods will also draw higher currents (less than or equal to the maximum in-rush current). Since the positioner also controls or detects these extraneous conditions, they too can be accounted for.

Since Hc on periods may have different heating effects, the algorithm assigns a heat value, referred to as h, to each Hc on period based on the event associated with the given Hc on period (i.e., normal, in-rush, brake, or stall). Therefore, HCUM is incremented by the value of h for any given Hc on period rather than just one. Since different motors will have varying characteristics, the values assigned to h will need to consider a specific range of applications. The following discussions explain how the h value is assigned for the intended application. However, the assumptions that are made could be altered to suit a different application or range of applications. The assumptions made by the algorithm bias the value of h for maximum expected heat over the range of applications. This insures that the HCUM value is always equal to or greater than the actual temperature rise in the motor. The h value for a normal Hc on period is assigned a value of 1 since its heating effect is offset by a single Hc off period. Other values for h then represent a multiple of the normal running current.

Figure 9:
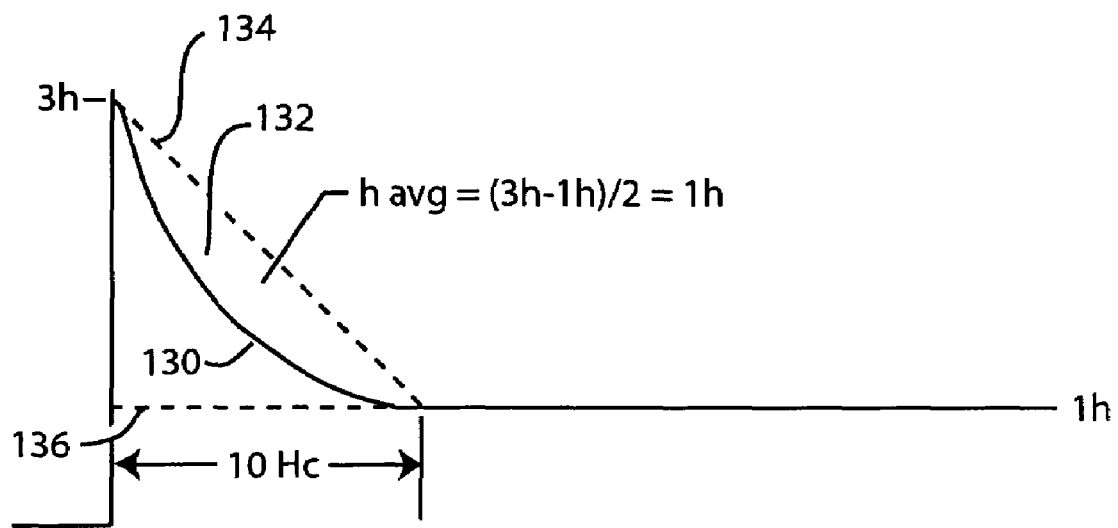
FIG. 9 is an in-rush current waveform diagram.

Referring to FIG. 9, the in-rush current 130 is merely a function of the AC line voltage divided by the motor winding resistance, and defines the maximum current that can be developed through the motor winding. For the intended application, the in-rush current 130 would not be more than three times the normal running current. Therefore, the in-rush current 130 is designated a value of 3h. Once the motor starts to rotate, the counter EMF produced by the motor logarithmically reduces the motor current to its normal running current in a period of no more than 10 Hc. To simplify calculations, the triangle 132 formed by the dotted lines 134 and 136 represents an average h value of 1 for each of the 10 Hc on periods. This average value is in addition to the normal h value, so the total average h value for each in-rush Hc is 2. Whenever a run sequence is started, the algorithm assigns a 2h value to the first 10 Hc periods. Since the pulse mode inherently operates with very low duty cycles, the algorithm does not add additional value to Hc on periods during a pulse sequence.

The actuator controller detects a stall condition if no motion is detected for a period of 360 Hc. For this period, the motor current is assumed to be at the maximum of 3 times normal current and is assigned a value of 3h. When the actuator controller detects a stall, the algorithm adds the additional 720 counts to HCUM while the normal 360 counts are tallied as they occur. During a brake sequence, it is also assumed that the current is at maximum of 3 times normal running current. The algorithm therefore assigns a value of 3h to each of the brake sequence Hc periods.

An additional feature implemented in the actuator controller modifies when duty control is initially enabled. To allow more operating time in the normal mode, the actuator controller provides 100% duty cycle until HCUM reaches a value that corresponds to 25% duty cycle (the bottom end of the intended applications). At that time, proportional duty cycle control remains on as long as HCUM has a value greater than the low limit. Once HCUM falls below the low limit, 100% duty control resumes and is allowed until the 25% duty cycle point is reached. This technique is only a variant of the temperature dependent duty control algorithm and can also be used with a temperature sensor.

Independent Position Output

To provide simple installation, the actuator controller may include a user-friendly interface, such as a three button control panel that allows a user to configure the controller for a specific actuator and valve without the need of instrumentation or calibration. One control button (mode), is used to select a specific function, while the other two (adjust up and adjust down) are used to adjust the selected function.

Two of the available functions, OPEN and CLOSED, allow the user to set the open position that is associated with the maximum command signal and the closed position associated with minimum command signal by merely operating the actuator with the adjust up and adjust down buttons. Both positions can be set to any desired position within the range of the actuator, thus providing direct or reverse acting functions with any desired range without the need to rewire the actuator. This also eliminates the need for instrumentation that is usually required to provide a command signal for setting these positions.

The actuator controller also has a polarity detection system that automatically determines the relationship between the feedback potentiometer rotation and the motor rotation. This eliminates the need for rewiring the motor and/or feedback potentiometer to obtain the desired motion in response to the command signal.

Automation systems commonly desire a return position signal from an actuator. Often this signal is used to drive a display meter that has a fixed calibrated range. This signal is provided in one of two ways: a separate transmitter module or an embedded transmitter in the positioner. A separate module must be wired to the feedback potentiometer—and in some cases uses its own potentiometer—and then is calibrated for the desired display reading for open and closed. Embedded transmitter functions eliminate the need for wiring a separate module. However, both methods require moving the actuator to the open and closed positions in order to calibrate the output signal.

Some embedded transmitter functions automatically associate the maximum output signal to the open position and the minimum output signal to the closed position. While this eliminates the calibration step, the output signal has a fixed scale, thus requiring the user to provide all scaling functions to obtain a desired display reading. Embedded transmitters are also bound to a fixed polarity; that is, maximum signal cannot be associated with the closed position. A separate module can provide inverted polarity, but must be rewired in order to do so.

The preferred embodiment uses an algorithm that provides an independent position output signal that does not require moving the actuator, eliminates rewiring for a specific polarity, and automatically scales the output for any desired reading within the range of the output signal. The algorithm can be engaged at anytime without interrupting or disturbing normal operation of the positioner. However, to avoid inadvertent signals and the need for additional control buttons, the actuator controller implements the algorithm as two additional functions selected by the mode button as part of the normal configuration process.

Digital positioners have the capability of storing nonvolatile information, which is the case with the present invention. The actuator controller stores the exact feedback potentiometer signal values for the open and closed positions when the user configures the actuator with the OPEN and CLOSED functions described earlier. By selecting the OPEN POSITION OUTPUT function on the actuator controller, the algorithm is enabled to adjust, and then save, the position output signal to any desired value within its range that is to be associated with the feedback potentiometer value at open. Likewise, by selecting the CLOSED POSITION OUTPUT function, the algorithm is enabled to adjust, and then save, the position output signal to any desired value within its range that is to be associated with the feedback potentiometer value at closed.

Knowing the four desired values, a digital positioner can perform basic addition and multiplication operations to provide any offset, gain, or polarity to the output signal regardless of the offset, gain, or polarity established for the command signal. Changing the open and closed positions does not change the output signal that is associated with each. Likewise, changing the open and close position output signals does not change the open and closed positions. This eliminates the need for rewiring to obtain any given polarity and allows the polarity of operation to be independent of the polarity of the output signal. Since the four required variables for calculating the output signal are stored in memory, it is not necessary to move the actuator to open or closed in order to obtain those two specific values regardless of what other function the positioner is performing.

The algorithm can be described in mathematical terms which can be easily converted to microprocessor code. Since the algorithm provides any desired polarity, negative numbers are allowed. In other words, the microprocessor code needs to use signed math functions in order to execute the complete algorithm. The following mathematical function defines the algorithm:

$$f(Op)=[(Oo-Oc)\cdot(Fp-Fc)/(Fo-Fc)]+Oc,$$

Where Fp is feedback potentiometer value at any given position between open and closed; Fo is feedback potentiometer value at the desired open position; Fc is feedback potentiometer value at the desired closed position; Op is an output signal associated with any given position between open and closed; Oo is a desired output signal associated with the open position; and Oc is a desired output signal associated with the closed position.

Since the F terms always reduce to a ratio (representing percent open), Op is strictly a function of Oo and Oc, thus showing that Op is independent of the operating parameters described by the F terms. This is clearly seen when Fp becomes equal to Fo at the open position, and Op resolves to Oo. Likewise, when Fp becomes equal to Fc at the closed position, Op resolves to Oc.

Exemplary Circuit Details

Figure 11:
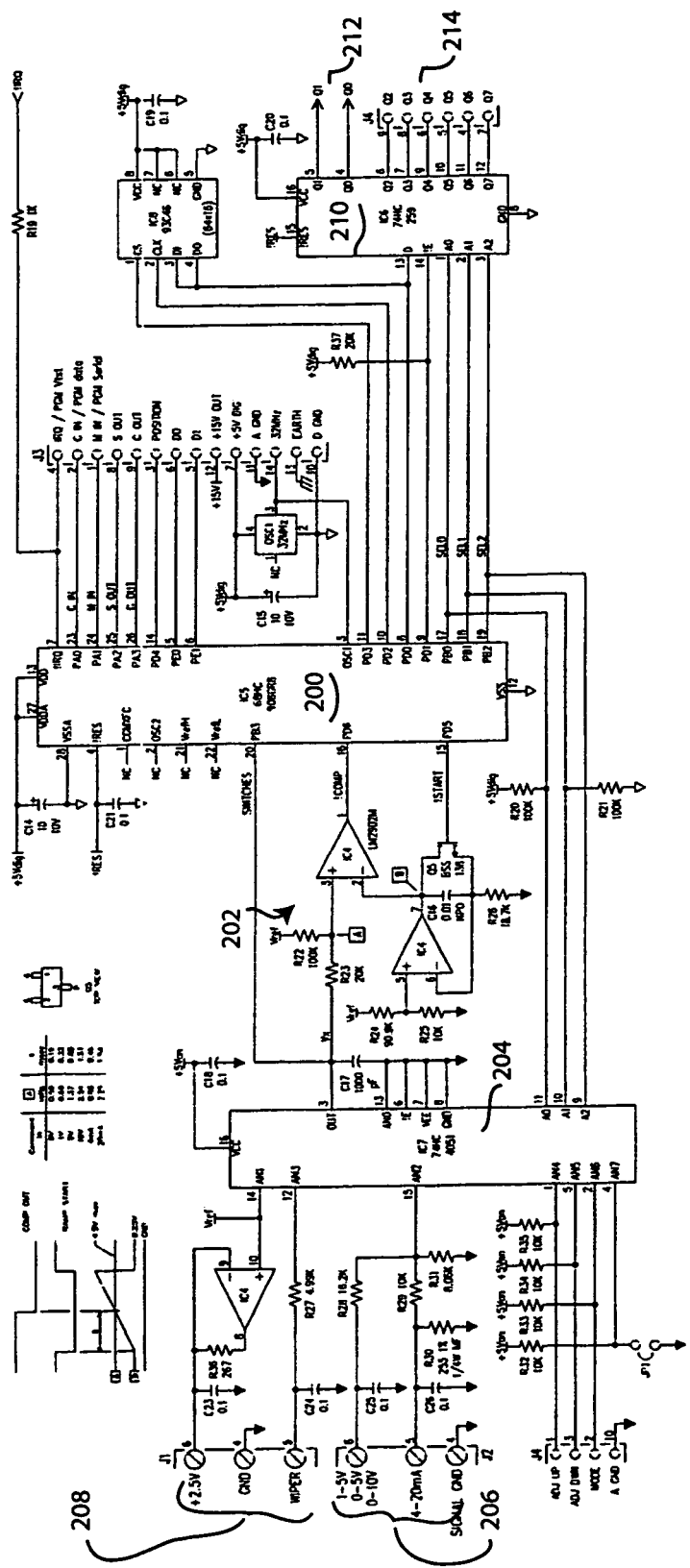
FIG. 11 is a detailed schematic diagram of a presently preferred implementation of the controller.
Figure 12:
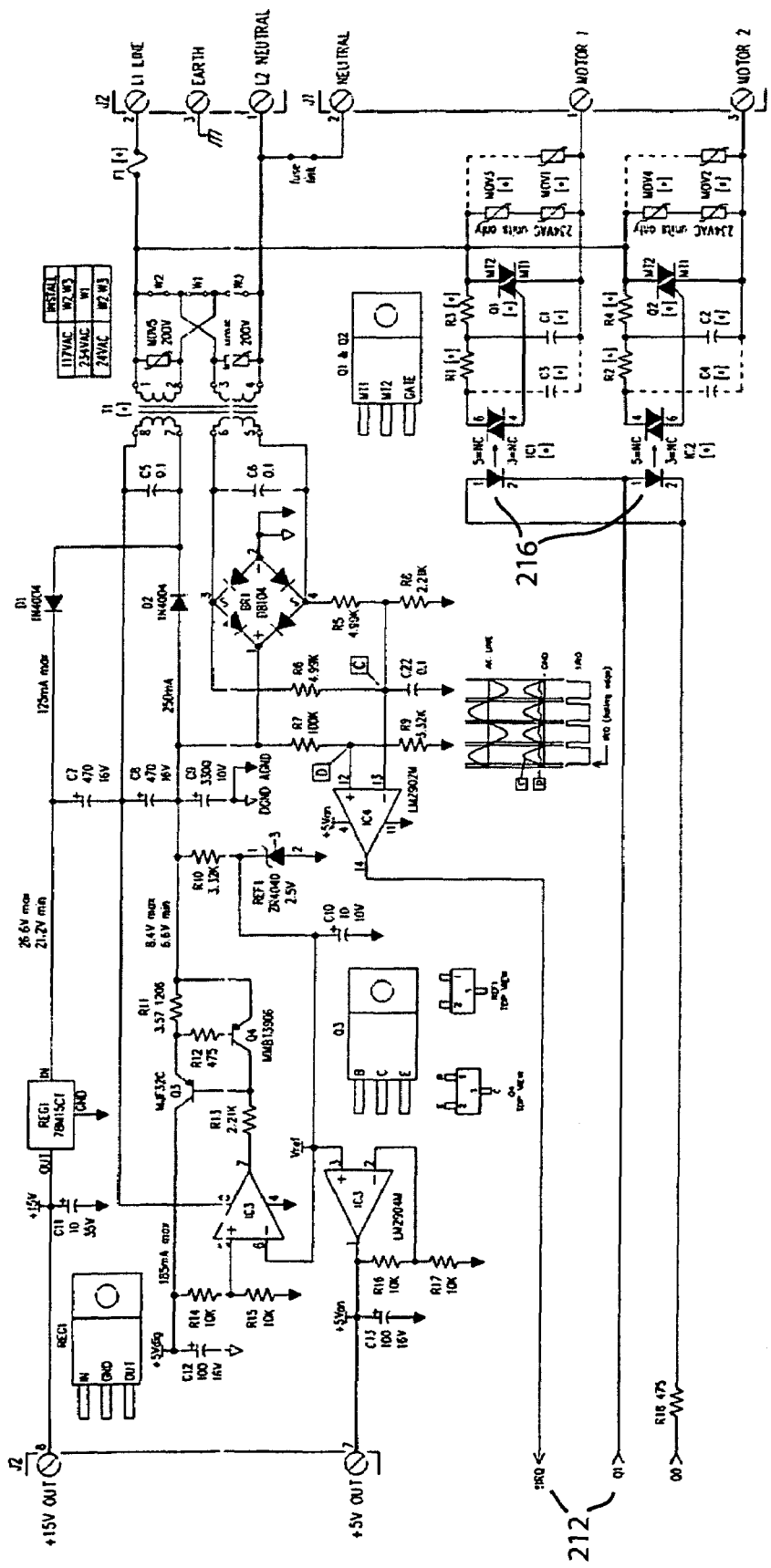
FIG. 12 is a detailed schematic diagram of a power supply for the implementation of FIG. 11.

While the digital high-resolution controller can be implemented using a variety of different technologies, one exemplary implementation is illustrated in FIGS. 11 and 12. FIG. 11 illustrates a microprocessor-based controller circuit and FIG. 12 illustrates a suitable power supply for the controller of FIG. 11. Referring to FIG. 11, the microprocessor 200 receives data input from a single slope analog to digital converter 202, which fed by multiplexer 204. The input to the analog to digital converter is supplied at 206. The feedback potentiometer is coupled to connection terminals 208. The microprocessor provides its output to the multiplexer device 210, which supplies control instructions to the motor at terminals 212 and also provides output terminals 214 to drive a display. Referring to FIG. 12, note that the output terminals 212 supply signals through optocoupler LEDs 216, with the output thereof being coupled to the motor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electronic positioning system for an actuator, comprising:
    an actuator operator configured to produce a change in position in an actuator from an initial position to a desired position;
    a sensor to ascertain the instantaneous position of the actuator at points intermediate the initial and desired positions;
    a controller that determines and progressively applies calculated discrete quantities of electrical energy to said actuator operator to induce successive changes in actuator position and thereby progressively move the actuator from the initial position to the desired position;

wherein the controller determines the quantities of electrical energy progressively applied, based on measured changes in instantaneous position of the actuator at points intermediate the initial and desired positions produced by prior applications of electrical energy to said actuator operator.

2. The electronic positioning system of claim 1 further comprising a braking system that impedes motion of said actuator prior to said application of electrical energy.

3. The electronic positioning system of claim 1 further comprising an electronic braking system that applies alternating energy in at least one of first and second directions.

4. The electronic positioning system of claim 1 wherein said controller determines an inertial compensation value according to coast of the actuator.

5. The electronic positioning system of claim 4 wherein said controller causes a braking sequence based at least in part on the inertial compensation value.

6. The electronic positioning system of claim 4 wherein said controller causes a braking sequence based at least in part on the inertial compensation value and on a desired position of the actuator.

7. The electronic positioning system of claim 1 wherein said controller applies a pulse of electrical energy with a duty cycle that is determined according to changes in position sensed from at least one previous application of electrical energy.

8. The electronic positioning system of claim 1 wherein said controller applies a pulse of electrical energy with a duty cycle and frequency that is determined according to changes in position sensed from at least one previous application of electrical energy.

9. The electronic positioning system of claim 8 wherein the controller determines a rate of change in frequency of applied pulses according to changes in position sensed from at least one previous application of electrical energy.

10. The electronic positioning system of claim 1 wherein said controller applies energy at a rate that is inversely proportional to the temperature of a force producing device that produces said induced changes in position.

11. The electronic positioning system of claim 10 wherein said controller determines temperature according to the amount of electrical energy applied over a given period of time.

12. The electronic positioning system of claim 1 wherein said controller includes analog to digital converter that provides a first faster and lower resolution conversion for motions above a predetermined size and a second slower and higher resolution conversion for motions below a predetermined size.

13. The electronic positioning system of claim 1 wherein said controller is configured to reject electrical noise in said second resolution conversion according to the number of consecutive conversions having a given differential value from an average value of previous conversion values.

14. The electronic positioning system of claim 1 wherein said controller is configured to inhibit application of energy to the actuator according to a lack of motion over a given period of time.

15. The electronic positioning system of claim 1 wherein said controller is configured to determine an association between a desired direction and energy applied to a given direction.

16. The electronic positioning system of claim 1 wherein the actuator operator is configured to produce changes in position in first and second directions and the controller applies energy to the appropriate direction according to a desired direction.

17. The electronic positioning system of claim 14 wherein the controller is configured to reengage energy to the actuator when motion of the actuator is detected after a stall condition.

18. An electronic positioning system for an actuator, comprising:

an actuator operator configured to produce a change in position in an actuator in at least a first direction;

a sensor to ascertain the position of the actuator;

a controller that variably applies a measured quantity of electrical energy to said actuator operator to induce a change in position in said at least a first direction, wherein said variable application of said measured quantity of electrical energy is determined by change in position sensed from at least one previous application of said measured quantity of electrical energy;

wherein said controller is configured to automatically produce a desired output signal that is proportional to the difference of any two selected positions, where such proportionality remains the same regardless of the difference between the selected positions.

19. A method of controlling a actuator comprising:

supplying a first measured quantity of energy to said actuator to produce change in position;

observing the change in position produced thereby; and supplying a second quantity of energy to said actuator, wherein the second measured quantity is determined based on the change in position observed and further comprising controlling the time interval between supplying said first and second quantities of energy such that said time interval is a first value when the assessed distance is within a first proximity range and a second value when the assessed distance is within a second proximity range.

20. The method of claim 19 further comprising controlling the time interval between supplying said first and second quantities of energy based on assessed distance from said desired position.

21. The method of claim 19 wherein said second proximity range is closer to said desired position than said first proximity range and said second value is greater than said first value.

22. The method of claim 19 further comprising engaging a braking system after supplying said first quantity of energy to inhibit movement prior to supplying said second quantity of energy.

23. The method of claim 19 wherein said at least one of said first quantity of energy and said second quantity of energy is supplied as a measured quantity of energy.

24. The method of claim 19 wherein said at least one of said first quantity of energy and said second quantity of energy is supplied as a measured quantity of energy pulses.

25. An electronic positioning system for an actuator, comprising:

an actuator operator configured to produce motion in an actuator in at least a first direction;

a sensor to ascertain the position of the actuator;

a controller that variably applies electrical energy to said actuator operator to induce motion to be produced in said at least a first direction, wherein said variable application of electrical energy is determined by motion sensed from at least one previous application of electrical energy;

wherein said controller includes analog to digital converter that provides a first faster and lower resolution conversion for motions above a predetermined size and a second slower and higher resolution conversion for motions below a predetermined size.

26. An electronic positioning system for an actuator, comprising:

an actuator operator configured to produce motion in an actuator in at least a first direction;

a sensor to ascertain the position of the actuator;

a controller that variably applies electrical energy to said actuator operator to induce motion to be produced in said at least a first direction, wherein said variable application of electrical energy is determined by motion sensed from at least one previous application of electrical energy;

wherein said controller is configured to reject electrical noise in said second resolution conversion according to the number of consecutive conversions having a given differential value from an average value of previous conversion values.

27. In a controller for controlling a process having at least one changing parameter, the improvement comprising:

an analog to digital converter that provides a first faster and lower resolution conversion for changes in said parameter above a predetermined size and a second slower and higher resolution conversion for changes in said parameter below a predetermined size.

28. In a controller for controlling a process having at least one parameter sensed in the presence of noise, the method of reducing the effect of said noise comprising:

calculating an average of said parameter by taking sample readings of said parameter;

eliminating a sample reading from the average calculation if the differential corresponding to the difference between the reading and the average exceeds a certain amount;

using said sample reading if a certain number of previous and consecutive sample readings persist above said differential in a same polarity.

29. An electronic positioning system for an actuator comprising:

an actuator operator configured to produce a change in position in an actuator from a first position to a second position;

a controller that applies energy to the actuator operator to produce motion of the actuator (a) in a first direction from the first position towards the second position and (b) in a second direction from the second position towards the first postion;

an electronic braking system that uses said controller to equally apply energy to the actuator operator in an alternating fashion at a controlled rate and for a controlled time to produce alternating motion of the actuator in the first and second directions until the inertia of the actuator in said first and second directions is substantially balanced.

30. An electronic positioning system for an actuator, comprising:

an actuator operator configured to produce a change in position in an actuator from an initial position to a desired position;

a sensor to ascertain the instantaneous position of the actuator at points intermediate the initial and desired positions;

a controller that applies energy at a rate that is inversely proportional to the temperature of said actuator.

31. The electronic positioning system of claim 30 wherein said temperature is determined according to the amount of energy applied over a given period of time.

* * * * *

UNITED STATES PATENT AND TRADEMARK OFFICE
CERTIFICATE OF CORRECTION

| | | |
|---|---|---|
| PATENT NO. | : 7,466,100 B2 | |
| APPLICATION NO. | : 11/037427 | |
| DATED | : December 16, 2008 | |
| INVENTOR(S) | : Mueller et al. | |

It is certified that error appears in the above-identified patent and that said Letters Patent is hereby corrected as shown below:

On the Cover page, (*) Notice:    Subject to any disclaimer, the term of this patent is extended or adjusted under 35 USC 154(b) by 435 days.

Delete the phrase "by 435 days" and insert -- by 440 days --.

Signed and Sealed this

Tenth Day of August, 2010

David J. Kappos
*Director of the United States Patent and Trademark Office*